United States Patent
Liu et al.

(10) Patent No.: US 12,464,486 B2
(45) Date of Patent: Nov. 4, 2025

(54) METHOD FOR CONTROLLING POSITIONING INTEGRITY AND APPARATUS

(71) Applicant: HUAWEI TECHNOLOGIES CO., LTD., Shenzhen (CN)

(72) Inventors: Mengting Liu, Beijing (CN); Su Huang, Shanghai (CN); Junren Chang, Beijing (CN); Xi Xie, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 517 days.

(21) Appl. No.: 17/953,774

(22) Filed: Sep. 27, 2022

(65) Prior Publication Data
US 2023/0080149 A1     Mar. 16, 2023

Related U.S. Application Data

(63) Continuation of application No. PCT/CN2020/082225, filed on Mar. 30, 2020.

(51) Int. Cl.
    *H04W 64/00*      (2009.01)

(52) U.S. Cl.
    CPC .................. *H04W 64/00* (2013.01)

(58) Field of Classification Search
CPC ... H04W 64/00; H04W 24/04; H04W 64/006; G01S 5/0244
See application file for complete search history.

(56) References Cited

U.S. PATENT DOCUMENTS

| | | | | |
|---|---|---|---|---|
| 6,466,846 B2* | 10/2002 | Maynard | ............... | G01S 5/0009 701/13 |
| 2011/0159886 A1 | 6/2011 | Kangas et al. | | |

(Continued)

FOREIGN PATENT DOCUMENTS

| CN | 1795396 A | 6/2006 |
|---|---|---|
| CN | 101390311 A | 3/2009 |

(Continued)

OTHER PUBLICATIONS

Swift Navigation Deutsche Telekom:"Rel-17 PositioningIntegrity", 3GPP Draft; RP-192750, 3rd Generation Partnershipproject (3GPP), Mobile Competence Centre;650, Route Des Lucioles; F-06921 Sophia-Antipolis Cedexfrancevol. TSG RAN, No. Sitges, Spain;Dec. 9, 2019-Dec. 12, 2019 Dec. 2, 2019 (Dec. 2, 2019), XP051834352.

(Continued)

*Primary Examiner* — Julio R Perez
(74) *Attorney, Agent, or Firm* — HAUPTMAN HAM, LLP

(57) ABSTRACT

A method for controlling positioning integrity. A location management device receives a first message sent by a terminal device, where the first message includes a first parameter set. The first parameter set includes measurement information and/or error information relating to location information of the terminal device. The error information is related to the positioning integrity. The location management device obtains a first positioning result based on the first parameter set and/or positioning assistance data. The first positioning result includes location information and/or integrity information of the terminal device. The integrity information includes the error information and/or alarm information, and the alarm information includes a determining result obtained by comparing the first positioning result with a preset determining condition.

18 Claims, 12 Drawing Sheets

(56) References Cited

U.S. PATENT DOCUMENTS

| | | | |
|---|---|---|---|
| 2014/0286261 | A1 | 9/2014 | Vujcic |
| 2022/0116904 | A1* | 4/2022 | Fakoorian ......... H04W 28/0975 |
| 2022/0163974 | A1* | 5/2022 | Davis ................ G05D 1/628 |
| 2022/0417887 | A1* | 12/2022 | Li ..................... H04W 24/10 |
| 2023/0080149 | A1* | 3/2023 | Liu .................. H04W 64/006 455/456.1 |
| 2023/0176161 | A1* | 6/2023 | Gunnarsson ........ H04W 64/00 455/456.1 |
| 2023/0328525 | A1* | 10/2023 | Shreevastav ....... H04W 12/041 455/456.1 |
| 2024/0151802 | A1* | 5/2024 | Thomas ............. G01S 5/0244 |

FOREIGN PATENT DOCUMENTS

| | | | |
|---|---|---|---|
| CN | 102223596 | A | 10/2011 |
| CN | 102783188 | A | 11/2012 |
| CN | 106658701 | A | 5/2017 |
| CN | 109474894 | A | 3/2019 |
| KR | 20090121695 | A | 11/2009 |
| WO | WO-2021225499 | A1 * | 11/2021 ............ H04W 64/00 |

OTHER PUBLICATIONS

3GPP TS 36.355 V12.0.0, 3rd Generation Partnership Project; Technical Specification Group Radio Access Network; Evolved Universal Terrestrial Radio Access (E-UTRA); LTE Positioning Protocol (LPP) (Release 12), Dec. 2013. total 126 pages.

3GPP TS 37.355 V15.0.0 (Dec. 2019), 3rd Generation Partnership Project; Technical Specification Group Radio Access Network;LTE Positioning Protocol (LPP)(Release 15), 224 pages.

"5G; NG Radio Access Network (NG-RAN); Stage 2 functionalspecification of User Equipment (UE) positioning in NG-RAN (3GPPTS 38.305 version 15.0.0 Release 15)", ETSI Technical Specification, Europeantelecommunications Standards Institute (ETSI), 650, Route Des Lucioles;F-06921 Sophia-Antipolis; Francevol. 3GPP RAN, No. V15.0.0 Sep. 18, 2018 (Sep. 18, 2018), pp. 1-57, XP014330476.

3GPP TR 22.872 V16.1.0 (Sep. 2018), 3rd Generation Partnership Project; Technical Specification Group Services and System Aspects; Study on positioning use cases; Stage 1(Release 16), 75 pages.

3GPP TS 24.501 V0.1.0 (Nov. 2017);3rd Generation Partnership Project; Technical Specification Group Core Network and Terminals;Non-Access-Stratum (NAS) protocol for 5G System (5GS); Stage 3(Release 15);total 16 pages.

Qualcomm Incorporated (Moderator): "Email summaryon NR positioning", 3GPP Draft; RP-192412, 3rd Generation Partnershipproject (3GPP), Mobile Competence Centre;650, Route Des Lucioles; F-06921 Sophia-Antipolis Cedex;Francevol. TSG RAN, No. Sitges, Spain;Dec. 9, 2019-Dec. 12, 2019 Dec. 2, 2019 (Dec. 2, 2019), XP051834111.

3GPP TS 22.104 V16.1.0 (Mar. 2019), 3rd Generation Partnership Project; Technical Specification Group Services and System Aspects; Service requirements for cyber-physical control applications in vertical domains; Stage 1(Release 16), 54 pages.

3GPP TS 24.571 V2.0.0 (Mar. 2020), 3rd Generation Partnership Project; Technical Specification Group Core Network and Terminals;5G System;Control Plane Location Services (LCS) procedures; Stage 3;(Release 16), 29 pages.

Sven Fischer, Observed Time Difference of Arrival (OTDOA) Positioning in 3GPP LTE, Jun. 6, 2014.

Tian Xiaohua et al., A Mobile Station Locating Method for a Cellular Communication System Based on GDOP, 2002, 4 pages.

3GPP TS 23.032 V12.0.0 (Sep. 2014),3rd Generation Partnership Project; Technical Specification Group Services and System Aspects; Universal Geographical Area Description (GAD)(Release 12), total 29 pages.

3GPP TS 23.273 V16.1.0, 3rd Generation Partnership Project; Technical Specification Group Services and System Aspects; 5G System (5GS) Location Services (LCS); Stage 2(Release 16), Sep. 2019, 90 pages.

Huawei, HiSilicon, Remaining issues on NR positioning measurements, 3GPP TSG RAN WG1 Meeting #99, R1-1911898, Reno, USA, Nov. 18-22, 2019, 12 pages.

Nokia, Nokia Shanghai Bell, Measurements for NR Positioning, 3GPP TSG RAN WG1 #98, R1-1908348, Prague, CZ, Aug. 26-30, 2019, 9 pages.

Navipedia, Integrity, 2018, https://gssc.esa.int/navipedia/index.php/Integrity#cite_note-Annex10-3, 4 pages.

RP-193237, Qualcomm Incorporated, New SID on NR Positioning Enhancements, 3GPP TSG RAN Meeting #86, Sitges, Spain, Dec. 9-12, 2019, 4 pages.

International Search Report issued in corresponding International Application No. PCT/CN2020/082225, dated Jan. 7, 2021, pp. 1-13.

Extended European Search Report issued in corresponding European Application No. 20928632.7, dated Jul. 21, 2023, pp. 1-10.

\* cited by examiner

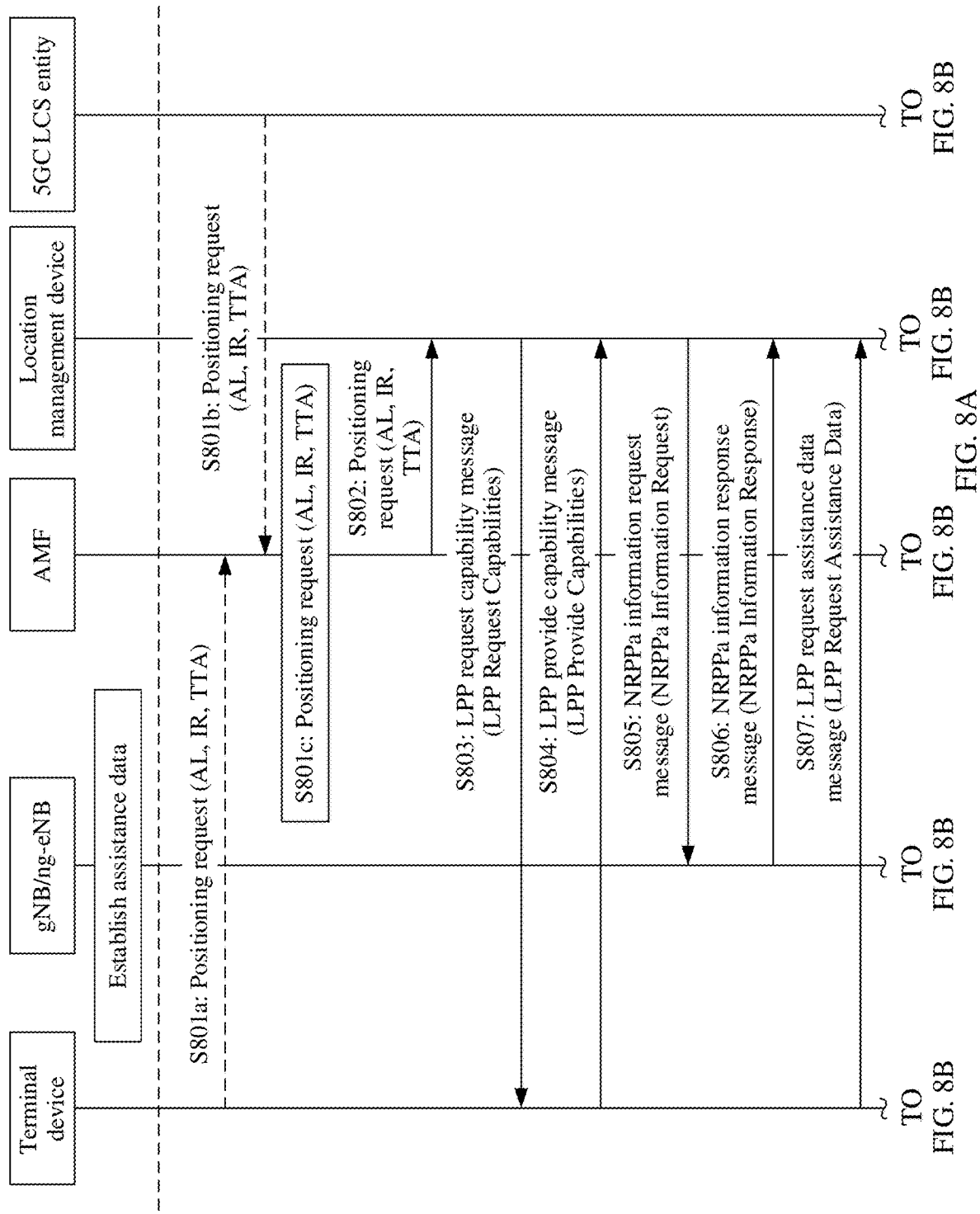

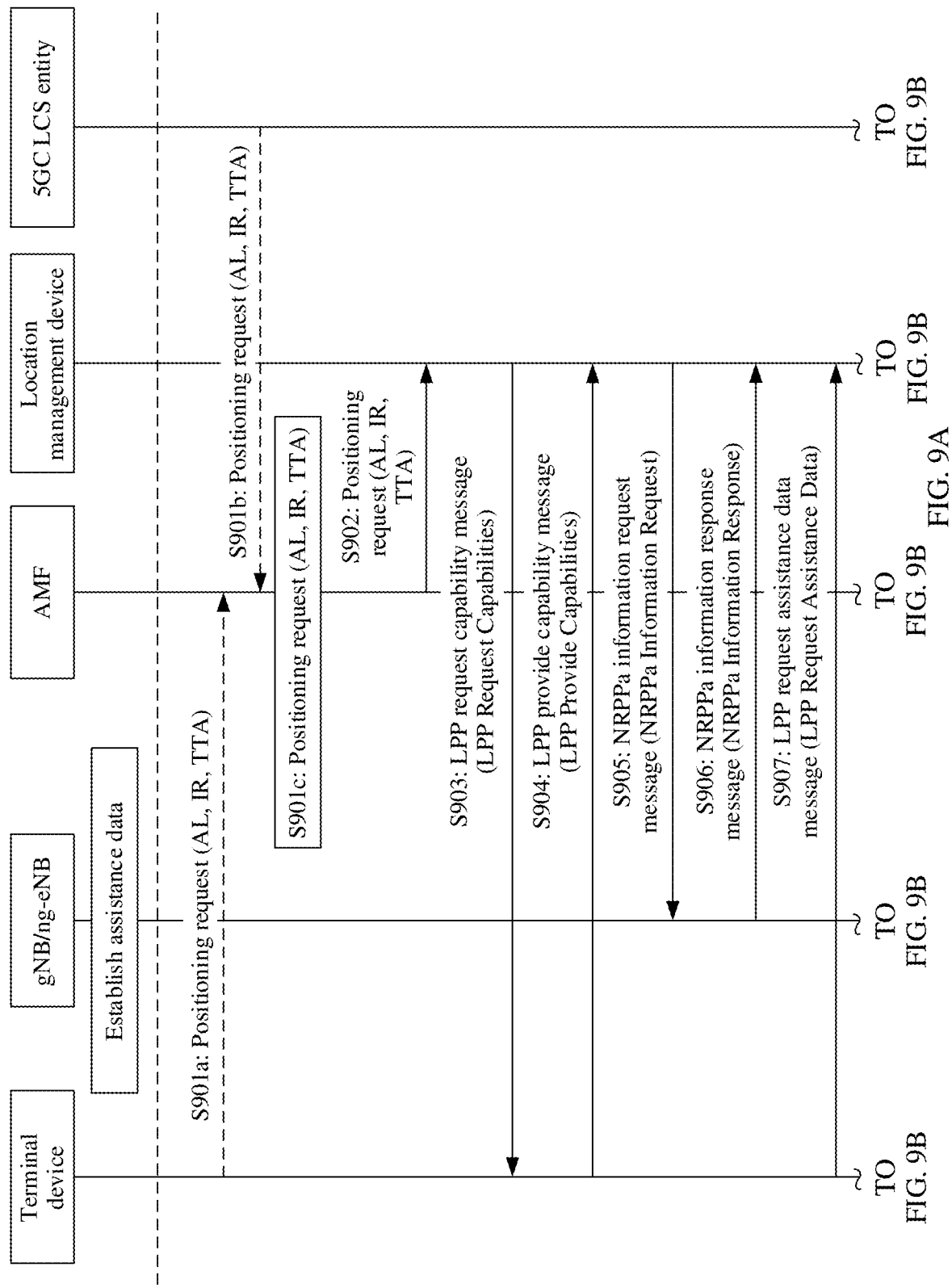

METHOD FOR CONTROLLING POSITIONING INTEGRITY AND APPARATUS

CROSS-REFERENCE TO RELATED APPLICATIONS

This application is a continuation of International Application No. PCT/CN2020/082225, filed on Mar. 30, 2020, the disclosure of which is hereby incorporated by reference in its entirety.

BACKGROUND TECHNOLOGY

Currently, the 3rd generation partnership project (3rd generation partnership project, 3GPP) technical report (technical report, TR) 22.872 defines a preliminary concept of positioning integrity. In other words, integrity is a measure of the trust, and the trust refers to a degree of trust in accuracy of information provided by a navigation system. The integrity further includes an ability to provide timely and valid warnings to a terminal device in response to a positioning system not fulfilling a condition for an intended operation (for example, in response to a positioning error being large).

Ensuring the integrity of the positioning system is an important research point in R17. In a conventional technology, reporting of a positioning measurement error is only preliminarily researched, and currently there is no feasible solution for evaluating the positioning integrity of the positioning system. Consequently, the positioning integrity of the positioning system cannot be ensured, and positioning accuracy and reliability are poor.

SUMMARY

Embodiments described herein provide a method for controlling positioning integrity and an apparatus. A hierarchical alarm mechanism is used for positioning errors of different systems, and the positioning integrity is controlled in real time, to ensure high reliability of a positioning system.

According to a first aspect, a method for controlling positioning integrity is provided, including: A location management device receives a first message sent by a terminal device, where the first message includes a first parameter set, the first parameter set includes measurement information and/or error information that are/is related to location information of the terminal device, the error information is related to the positioning integrity, and the error information includes at least one or more of the following information: a protection level, an error source, an error value, a positioning error PE, an integrity level, a threat model, a threat occurrence rate, and a failure mode; and the location management device obtains a first positioning result based on the first parameter set and/or positioning assistance data, where the first positioning result includes location information and/or integrity information of the terminal device, the integrity information includes the error information and/or alarm information, the alarm information includes a determining result obtained by comparing the first positioning result with a preset determining condition, and the determining result includes at least one or more of the following information: information about whether an alarm is used, an alarm level corresponding to the first positioning result, and the error information.

At present, the 3GPP standard only discusses a measurement error in a positioning system, and does not consider other error sources that affect reliability of the positioning system. In addition, the existing positioning system lacks an alarm mechanism related to a system positioning error, and cannot ensure integrity (integrity) of the positioning system. In at least one embodiment, for an LMF-based positioning solution, the method for controlling the positioning integrity is designed, so that the positioning system is able to not send an alarm until the system is unavailable or an integrity risk occurs, but sends a warning in response to the integrity risk being about to occur, to ensure positioning accuracy in real time and high reliability of the positioning system.

In at least one embodiment, the determining result includes: in response to the first positioning result meeting the preset determining condition, the determining result includes at least one or more of the following information: the alarm information, the alarm level corresponding to the first positioning result, and the error information; and in response to the first positioning result not meeting the preset determining condition, the determining result selectively includes no-alarm information; or in response to the first positioning result not meeting the preset determining condition, the determining result includes at least one or more of the following information: the alarm information, the alarm level corresponding to the first positioning result, and the error information; and in response to the first positioning result meeting the preset determining condition, the determining result selectively includes no-alarm information.

According to the foregoing technical solution, the positioning system indicates the error information, for example, the error source and the error value, in the corresponding alarm information, so that the positioning system performs corresponding positioning error correction based on the error information, thereby effectively ensuring the integrity of the positioning system and high reliability of the positioning system.

In at least one embodiment, the method for controlling the positioning integrity further includes: the preset determining condition includes one or more sub-determining conditions, and the alarm level includes one or more sub-alarm levels; and one sub-alarm level corresponds to the one or more sub-determining conditions; or the one or more sub-alarm levels correspond to one sub-determining condition.

According to the foregoing technical solution, the positioning system uses a hierarchical alarm mechanism for positioning errors of different systems. This helps the positioning system determine whether a positioning result is valid, and enables the positioning system to make a corresponding adjustment according to operating statuses corresponding to different alarm levels. This operation ensures the integrity of the positioning system.

In at least one embodiment, the method for controlling the positioning integrity further includes: The location management device sends the first positioning result to an access and mobility management device.

According to the foregoing technical solution, the location management device sends, based on different manners of initiating a positioning request, the first positioning result including the error information and/or the alarm information to the access and mobility management device, or the access and mobility management device forwards the first positioning result to another device or function that initiates the positioning request.

In at least one embodiment, the location management device performs positioning error correction based on the first positioning result, and obtains a second positioning result obtained after the positioning error correction, where the second positioning result includes location information and/or integrity information, of the terminal device, obtained after the positioning error correction.

According to the foregoing technical solution, the location management device performs the positioning error correction on the first positioning result based on the error information reported by the terminal device, for example, the error source and the error value, to obtain the second positioning result obtained after the positioning error correction, to ensure positioning accuracy in real time and high reliability of the positioning system.

In at least one embodiment, the location management device sends the second positioning result to the access and mobility management device.

According to the foregoing technical solution, the location management device sends, based on different manners of initiating a positioning request, the second positioning result including the error information and/or the alarm information to the access and mobility management device, or the access and mobility management device forwards the second positioning result to another device or function that initiates the positioning request.

In at least one embodiment, before the location management device receives the first message sent by the terminal device, the method for controlling the positioning integrity further includes: The location management device receives a positioning request sent by the access and mobility management device, where the positioning request includes first indication information related to the positioning integrity, and the first indication information indicates one or more of the following information: an alert limit, an integrity risk, a time to alert, an error source, a threat model, a threat occurrence rate, a failure mode, an error value, and an integrity level.

The access and mobility management device receives a location service request related to the terminal device from a third-party device or function such as the terminal device or a 5GC LCS entity. Alternatively, the access and mobility management device initiates some positioning requests on behalf of a specific terminal device. According to the foregoing solution, the access and mobility management device forwards the positioning request (the location service request) to the location management device, to start a positioning procedure.

In at least one embodiment, before the location management device receives the first message sent by the terminal device, the method for controlling the positioning integrity further includes: The location management device receives a second message sent by a next-generation radio access network device, where the second message includes the positioning assistance data related to the location information of the terminal device.

According to the foregoing solution, the location management device obtains assistance data used for locating the terminal device. Then, the terminal device is located based on the assistance data.

According to a second aspect, a method for controlling positioning integrity is provided, including: A terminal device obtains a second parameter set, where the second parameter set includes measurement information and/or error information that are/is related to location information of the terminal device, the error information is related to the positioning integrity, and the error information includes at least one or more of the following information: a protection level, an error source, an error value, a positioning error PE, an integrity level, a threat model, a threat occurrence rate, and a failure mode; and the terminal device obtains a third positioning result based on the second parameter set and/or positioning assistance data, where the third positioning result includes location information and/or integrity information of the terminal device, the integrity information includes the error information and/or alarm information, the alarm information includes a determining result obtained by comparing the third positioning result with a preset determining condition, and the determining result includes at least one or more of the following information: information about whether an alarm is to be used, an alarm level corresponding to the third positioning result, and the error information.

At present, the 3GPP standard only discusses a measurement error in a positioning system, and does not consider other error sources that affect reliability of the positioning system. In addition, the existing positioning system lacks an alarm mechanism related to a system positioning error, and cannot ensure integrity (integrity) of the positioning system. In at least one embodiment, for a UE-based positioning solution, the method for controlling the positioning integrity is designed, so that the positioning system is able to not to send an alarm until the system is unavailable or an integrity risk occurs, but sends a warning in response to the integrity risk being about to occur, to ensure positioning accuracy in real time and high reliability of the positioning system.

In at least one embodiment, the determining result includes: in response to the third positioning result meeting the preset determining condition, the determining result includes at least one or more of the following information: the alarm information, an alarm level corresponding to the third positioning result, and the error information; and in response to the third positioning result not meeting the preset determining condition, the determining result selectively includes no-alarm information; or in response to the third positioning result not meeting the preset determining condition, the determining result includes at least one or more of the following information: the alarm information, an alarm level corresponding to the third positioning result, and the error information; and in response to the third positioning result meeting the preset determining condition, the determining result selectively includes no-alarm information.

According to the foregoing technical solution, the positioning system indicates the error information, for example, the error source and the error value, in the corresponding alarm information, so that the positioning system performs corresponding positioning error correction based on the error information, thereby effectively ensuring the integrity of the positioning system and high reliability of the positioning system.

In at least one embodiment, the method for controlling the positioning integrity further includes: the preset determining condition includes one or more sub-determining conditions, and the alarm level includes one or more sub-alarm levels; and one sub-alarm level corresponds to the one or more sub-determining conditions; or the one or more sub-alarm levels correspond to one sub-determining condition.

According to the foregoing technical solution, the positioning system uses a hierarchical alarm mechanism for positioning errors of different systems. This helps the positioning system determine whether a positioning result is valid, and enables the positioning system to make a corresponding adjustment according to operating statuses corresponding to different alarm levels. This operation ensures the integrity of the positioning system.

In at least one embodiment, the method for controlling the positioning integrity further includes: The terminal device sends the third positioning result to a location management device.

According to the foregoing technical solution, the terminal device sends the third positioning result including the error information and/or the alarm information to the location management device. This helps the location management device perform subsequent positioning processing. Alternatively, the terminal device sends, based on different manners of initiating a positioning request, the third positioning result including the error information and/or the alarm information to the location management device, and the location management device finally forwards the third positioning result to another device or function that initiates the positioning request.

In at least one embodiment, the method for controlling the positioning integrity further includes: The terminal device performs positioning error correction based on the third positioning result, and obtains a fourth positioning result obtained after the positioning error correction, where the fourth positioning result includes location information and/or integrity information, of the terminal device, obtained after the positioning error correction.

According to the foregoing technical solution, the terminal device performs the positioning error correction on the third positioning result based on the obtained error information, for example, the error source and the error value, to obtain the fourth positioning result obtained after the positioning error correction, to ensure positioning accuracy in real time and ensure high reliability of the positioning system.

In at least one embodiment, the terminal device sends the fourth positioning result to the location management device.

According to the foregoing technical solution, the terminal device sends the third positioning result, obtained after the positioning error correction, including the error information and/or the alarm information to the location management device. This helps the location management device perform subsequent positioning processing. Alternatively, the terminal device sends, based on different manners of initiating a positioning request, the fourth positioning result obtained after the positioning error correction to the location management device, and the location management device finally forwards the fourth positioning result to another device or function that initiates the positioning request.

In at least one embodiment, the method for controlling the positioning integrity further includes: The terminal device sends a positioning request to an access and mobility management device, where the positioning request includes first indication information related to the positioning integrity, and the first indication information indicates one or more of the following information: an alert limit, an integrity risk, a time to alert, an error source, a threat model, a threat occurrence rate, a failure mode, an error value, and an integrity level.

According to the foregoing solution, the terminal device forwards the positioning request (or referred to as a location service request) to the location management device by using the access and mobility management device, to initiate a positioning procedure.

In at least one embodiment, before the terminal device obtains the second parameter set, the method for controlling the positioning integrity further includes: The terminal device receives a third message sent by the location management device, where the third message includes the positioning assistance data related to the location information of the terminal device, and the positioning assistance data is received by the location management device from a next-generation radio access network device.

According to the foregoing solution, the terminal device obtains, from the location management device, assistance data used for locating the terminal device. Then, the terminal device is located based on the assistance data.

In at least one embodiment, that a terminal device obtains a second parameter set includes: The terminal device obtains the second parameter set through measurement, or from the next-generation radio access network device, or from a network device that participates in positioning and that includes a location management component.

According to the foregoing solution, the terminal device obtains the second parameter set used for locating the terminal device. The second parameter set is obtained through measurement performed by the terminal device, measurement performed by the network device participating in positioning, and/or measurement performed by the network device that participates in positioning and that includes the location management component.

According to a third aspect, a location management apparatus is provided, configured to perform the method according to any one of the first aspect. The location management apparatus is the location management device according to any one of the first aspect, or a module applied to the location management device, for example, a chip or a chip system. The location management apparatus includes a module, unit, or means (means) corresponding to the method performed by the location management apparatus according to any one of the first aspect. The module, unit, or means is implemented by hardware or software, or is implemented by hardware executing corresponding software. The hardware or software includes one or more modules or units corresponding to the function performed by the location management device according to any one of the first aspect.

The location management apparatus includes: a transceiver unit, configured to receive a first message sent by a terminal device, where the first message includes a first parameter set, the first parameter set includes measurement information and/or error information that are/is related to location information of the terminal device, the error information is related to positioning integrity, and the error information includes at least one or more of the following information: a protection level, an error source, an error value, a positioning error PE, an integrity level, a threat model, a threat occurrence rate, and a failure mode; and a processing unit, configured to obtain a first positioning result based on the first parameter set and/or positioning assistance data, where the first positioning result includes location information and/or integrity information of the terminal device, the integrity information includes the error information and/or alarm information, the alarm information includes a determining result obtained by comparing the first positioning result with a preset determining condition, and the determining result includes at least one or more of the following information: information about whether an alarm is used, an alarm level corresponding to the first positioning result, and the error information.

In at least one embodiment, the determining result includes: in response to the first positioning result meeting the preset determining condition, the determining result includes at least one or more of the following information: the alarm information, the alarm level corresponding to the first positioning result, and the error information; and in response to the first positioning result not meeting the preset determining condition, the determining result selectively includes no-alarm information; or in response to the first positioning result not meeting the preset determining condition, the determining result includes at least one or more of the following information: the alarm information, the alarm level corresponding to the first positioning result, and the error information; and in response to the first positioning result meeting the preset determining condition, the determining result selectively includes no-alarm information.

In at least one embodiment, the preset determining condition includes one or more sub-determining conditions, and the alarm level includes one or more sub-alarm levels; and one sub-alarm level corresponds to the one or more sub-determining conditions; or the one or more sub-alarm levels correspond to one sub-determining condition.

In at least one embodiment, the transceiver unit is further configured to send the first positioning result to an access and mobility management device.

In at least one embodiment, the processing unit is further configured to perform positioning error correction based on the first positioning result, and obtain a second positioning result obtained after the positioning error correction, where the second positioning result includes location information and/or integrity information, of the terminal device, obtained after the positioning error correction.

In at least one embodiment, the transceiver unit is further configured to send the second positioning result to the access and mobility management device.

In at least one embodiment, before receiving the first message sent by the terminal device, the transceiver unit is further configured to receive a positioning request sent by the access and mobility management device, where the positioning request includes first indication information related to the positioning integrity, and the first indication information indicates one or more of the following information: an alert limit, an integrity risk, a time to alert, an error source, a threat model, a threat occurrence rate, a failure mode, an error value, and an integrity level.

In at least one embodiment, before receiving the first message sent by the terminal device, the transceiver unit is further configured to receive a second message sent by a next-generation radio access network device, where the second message includes the positioning assistance data related to the location information of the terminal device.

For beneficial effects of any one of the third aspect, refer to the corresponding beneficial effects of any one of the first aspect. Details are not described herein again.

According to a fourth aspect, a terminal apparatus is provided, configured to perform the method according to any one of the second aspect. The terminal apparatus is the terminal device according to any one of the second aspect, or a module applied to the terminal device, for example, a chip or a chip system. The terminal apparatus includes a module, unit, or means (means) corresponding to the method performed by the terminal apparatus according to any one of the second aspect. The module, unit, or means is implemented by hardware or software, or is implemented by hardware executing corresponding software. The hardware or software includes one or more modules or units corresponding to the function performed by the terminal device according to any one of the second aspect.

The provided terminal apparatus includes: a processing unit, configured to obtain a second parameter set, where the second parameter set includes measurement information and/or error information that are/is related to location information of the terminal device, the error information is related to positioning integrity, and the error information includes at least one or more of the following information: a protection level, an error source, an error value, a positioning error PE, an integrity level, a threat model, a threat occurrence rate, and a failure mode; where the processing unit is further configured to obtain a third positioning result based on the second parameter set and/or positioning assistance data, where the third positioning result includes location information and/or integrity information of the terminal device, the integrity information includes the error information and/or alarm information, the alarm information includes a determining result obtained by comparing the third positioning result with a preset determining condition, and the determining result includes at least one or more of the following information: information about whether an alarm is used, an alarm level corresponding to the third positioning result, and the error information.

In at least one embodiment, the determining result includes: in response to the third positioning result meeting the preset determining condition, the determining result includes at least one or more of the following information: the alarm information, an alarm level corresponding to the third positioning result, and the error information; and in response to the third positioning result not meeting the preset determining condition, the determining result selectively includes no-alarm information; or in response to the third positioning result not meeting the preset determining condition, the determining result includes at least one or more of the following information: the alarm information, an alarm level corresponding to the third positioning result, and the error information; and in response to the third positioning result meeting the preset determining condition, the determining result selectively includes no-alarm information.

In at least one embodiment, the preset determining condition includes one or more sub-determining conditions, and the alarm level includes one or more sub-alarm levels; and one sub-alarm level corresponds to the one or more sub-determining conditions; or the one or more sub-alarm levels correspond to one sub-determining condition.

In at least one embodiment, the terminal apparatus further includes a transceiver unit, and the transceiver unit is configured to send the third positioning result to the location management device.

In at least one embodiment, the processing unit is further configured to perform positioning error correction based on the third positioning result, and obtain a fourth positioning result obtained after the positioning error correction, where the fourth positioning result includes location information and/or integrity information, of the terminal device, obtained after the positioning error correction.

In at least one embodiment, the transceiver unit is further configured to send the fourth positioning result to the location management device.

In at least one embodiment, before obtaining the second parameter set, the transceiver unit is further configured to send a positioning request to an access and mobility management device, where the positioning request includes first indication information related to the positioning integrity, and the first indication information indicates one or more of the following information: an alert limit, an integrity risk, a time to alert, an error source, a threat model, a threat occurrence rate, a failure mode, an error value, and an integrity level.

In at least one embodiment, before obtaining the second parameter set, the transceiver unit is further configured to receive a third message sent by the location management device, where the third message includes the positioning assistance data related to the location information of the terminal device, and the positioning assistance data is received by the location management device from a next-generation radio access network device.

In at least one embodiment, the obtaining the second parameter set includes: The terminal apparatus obtains the second parameter set through measurement, or from the next-generation radio access network device, or from a network device that participates in positioning and that includes a location management component.

For beneficial effects of the fourth aspect, refer to the corresponding beneficial effects of the second aspect. Details are not described herein again.

According to a fifth aspect, a location management apparatus is provided, including: a processor, configured to execute a program stored in a memory, where in response to the program being executed, the location management apparatus is enabled to perform the method according to the first aspect.

In at least one embodiment, the memory is located outside the location management apparatus.

According to a sixth aspect, a terminal apparatus is provided, including: a processor, configured to execute a program stored in a memory, where in response to the program being executed, the terminal apparatus is enabled to perform the method according to the second aspect.

In at least one embodiment, the memory is located outside the terminal apparatus.

According to a seventh aspect, a location management apparatus is provided, including: an input/output interface, configured to receive a first message sent by a terminal device, where the first message includes a first parameter set, the first parameter set includes measurement information and/or error information that are/is related to location information of the terminal device, the error information is related to positioning integrity, and the error information includes at least one or more of the following information: a protection level, an error source, an error value, a positioning error PE, an integrity level, a threat model, a threat occurrence rate, and a failure mode; and
    a logic circuit, configured to obtain a first positioning result based on the first parameter set and/or positioning assistance data, where the first positioning result includes location information and/or integrity information of the terminal device, the integrity information includes the error information and/or alarm information, the alarm information includes a determining result obtained by comparing the first positioning result with a preset determining condition, and the determining result includes at least one or more of the following information: information about whether an alarm is used, an alarm level corresponding to the first positioning result, and the error information.

According to an eighth aspect, a terminal apparatus is provided, including: a logic circuit, configured to obtain a second parameter set, where the second parameter set includes measurement information and/or error information that are/is related to location information of the terminal device, the error information is related to positioning integrity, and the error information includes at least one or more of the following information: a protection level, an error source, an error value, a positioning error PE, an integrity level, a threat model, a threat occurrence rate, and a failure mode; where
    the logic circuit is further configured to obtain a third positioning result based on the second parameter set and/or positioning assistance data, where the third positioning result includes location information and/or integrity information of the terminal device, the integrity information includes the error information and/or alarm information, the alarm information includes a determining result obtained by comparing the third positioning result with a preset determining condition, and the determining result includes at least one or more of the following information: information about whether an alarm is used, an alarm level corresponding to the third positioning result, and the error information; and
    the terminal device further includes an input/output interface, configured to perform an input/output function.

According to a ninth aspect, a computer-readable storage medium is provided. The computer-readable storage medium stores a computer program, and in response to the computer program being executed by a computer, the computer program is used to implement a function performed by the location management device according to the first aspect.

According to a tenth aspect, a computer-readable storage medium is provided. The computer-readable storage medium stores a computer program, and in response to the computer program being executed by a computer, the computer program is used to implement a function performed by the terminal device according to the second aspect.

According to an eleventh aspect, a computer program product is provided. The computer program product includes a computer program. In response to the computer program product being run on a computer, the computer program product is configured to implement a function performed by the location management device according to the first aspect.

According to a twelfth aspect, a computer program product is provided. The computer program product includes a computer program. In response to the computer program product being run on a computer, the computer program product is configured to implement a function performed by the terminal device according to the second aspect.

According to a thirteenth aspect, a chip system is provided, including at least one processor and an interface, where the at least one processor is coupled to a memory through the interface, and in response to executing a computer program or a computer-executable instruction in the memory, the at least one processor is configured to implement a function performed by the location management device according to the first aspect.

According to a fourteenth aspect, a chip system is provided, including at least one processor and an interface, where the at least one processor is coupled to a memory through the interface, and in response to executing a computer program or a computer-executable instruction in the memory, the at least one processor is configured to implement a function performed by the terminal device according to the second aspect.

For beneficial effects of the apparatus embodiments in the fifth aspect to the fourteenth aspect, refer to the beneficial effects of the corresponding method according to the first aspect or the second aspect. Details are not described herein again.

BRIEF DESCRIPTION OF DRAWINGS

FIG. 8A and FIG. 8B are a schematic flowchart of a method 800 for controlling positioning integrity according to at least one embodiment;

FIG. 9A and FIG. 9B are a schematic flowchart of another method 900 for controlling positioning integrity according to at least one embodiment;

DESCRIPTION OF EMBODIMENTS

The following details technical solutions of at least one embodiment with reference to the accompanying drawings.

Figure 1:
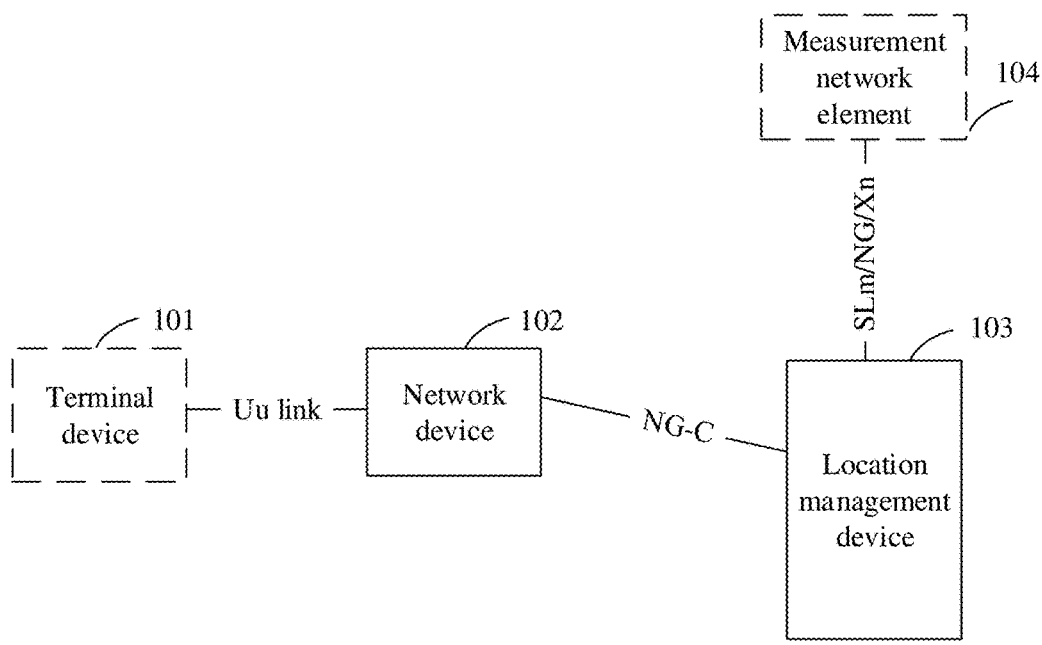
FIG. 1 is a schematic diagram 1 of a positioning system architecture according to at least one embodiment.

FIG. 1 shows a positioning system architecture applicable to at least one embodiment. The positioning system includes a terminal device 101, a network device 102, and a location management device 103. The location management device 103 is configured to perform positioning calculation on the terminal device 101 based on a measurement result of another network element (for example, the terminal device 101 or the network device 102), or the terminal device 101 performs positioning calculation on the terminal device 101 based on a measurement result of the terminal device 101 or another network element (for example, the network device 102). The positioning system further includes a measurement network element (or a location measurement network element) 104. The measurement network element is also referred to as a measurement node. The location management device 103 is connected to the measurement network element 104 through an SLM interface or an NG interface. In response to the measurement network element 104 being a network device, the location management device 103 is connected to the measurement network element 104 through the NG interface. An interface between the location management device 103 and the measurement network element 104 is alternatively an Xn interface. The network device 102 is a serving base station of the terminal device 101. The network device 102 provides an access service for the terminal device 101. After accessing the network device 102, the terminal device 101 communicates with a network side by using the network device 102. The measurement network element 104 is a network device, for example, a device configured to measure positioning information such as a next-generation base station (next-generation NodeB, gNB) or a positioning measurement unit (location measurement unit, LMU) in a 5th generation (5th generation, 5G) communication system, or the terminal device 101. The positioning information is obtained by measuring a reference signal sent by the terminal device or by measuring, by the terminal device, a reference signal sent by the network device. The network device or the LMU measure a reference signal sent by the terminal device 101, to obtain a measurement result for locating the terminal device. The terminal device alternatively measures a reference signal sent by the network device 102, to obtain a measurement result for locating the terminal device. An example in which the measurement network element 104 is a network device (for example, the serving base station or a neighboring cell base station) and the location management device 103 is connected to the measurement network element 104 through the NG interface is used below for description.

In at least one embodiment, the terminal device 101 communicates with the network device 102 through a cellular link (a Uu link), and the network device 102 communicates with the location management device 103 through an NG-C interface.

Figure 2:
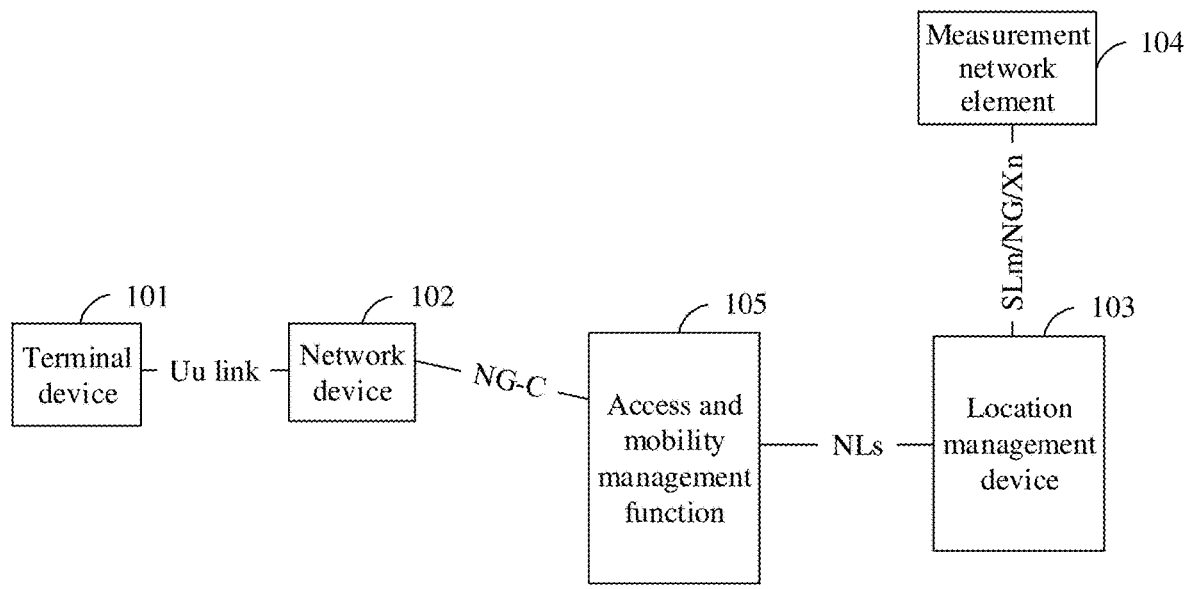
FIG. 2 is a schematic diagram 2 of a positioning system architecture according to at least one embodiment.

Optionally, based on the positioning system architecture shown in FIG. 1, as shown in FIG. 2, the positioning system further includes an access and mobility management function (access and mobility management function, AMF) 105. The access and mobility management function 105 is access control and mobility management that a control plane network element provided by an operator is responsible for accessing an operator network by the terminal device 101. The network device 102 communicates with the access and mobility management device 105 through the NG-C interface, and the access and mobility management function 105 communicates with the location management device 103 through an NLs interface. The location management device 103 interacts with the network device 102 by using the access and mobility management function 105.

Optionally, the location management device in at least one embodiment is a location management function (location management function, LMF) or a location management component (location management component, LMC), or is a local location management function (local location management function, LLMF) in the network device. In the following embodiments, an example in which the location management device is the location management function LMF is used for description. This is not limited in at least one embodiment.

The method for controlling the positioning integrity provided in at least one embodiment is applied to various communication systems, for example, a long term evolution (long term evolution, LTE) system, an LTE frequency division duplex (frequency division duplex, FDD) system, an LTE time division duplex (time division duplex, TDD) system, a 5th generation (5th generation, 5G) communication system, for example, a new radio (new radio, NR) system, or various future communication systems, for example, a 6th generation (6th generation, 6G) communication system, a public land mobile network (public land mobile network, PLMN), a device-to-device (device-to-device, D2D) communication system, a machine-to-machine (machine-to-machine, M2M) communication system, an internet of things (Internet of Things, IoT) communication system, or another communication system.

The 5G communication system is used as an example. A network element or an entity corresponding to the network device in FIG. 1 or FIG. 2 is a next-generation radio access network (next-generation radio access network, NG-RAN)

device in the 5G communication system. Optionally, in at least one embodiment, a "next-generation radio access network device" and a "network device" is considered equivalent. This is not specifically limited in at least one embodiment.

Figure 3:
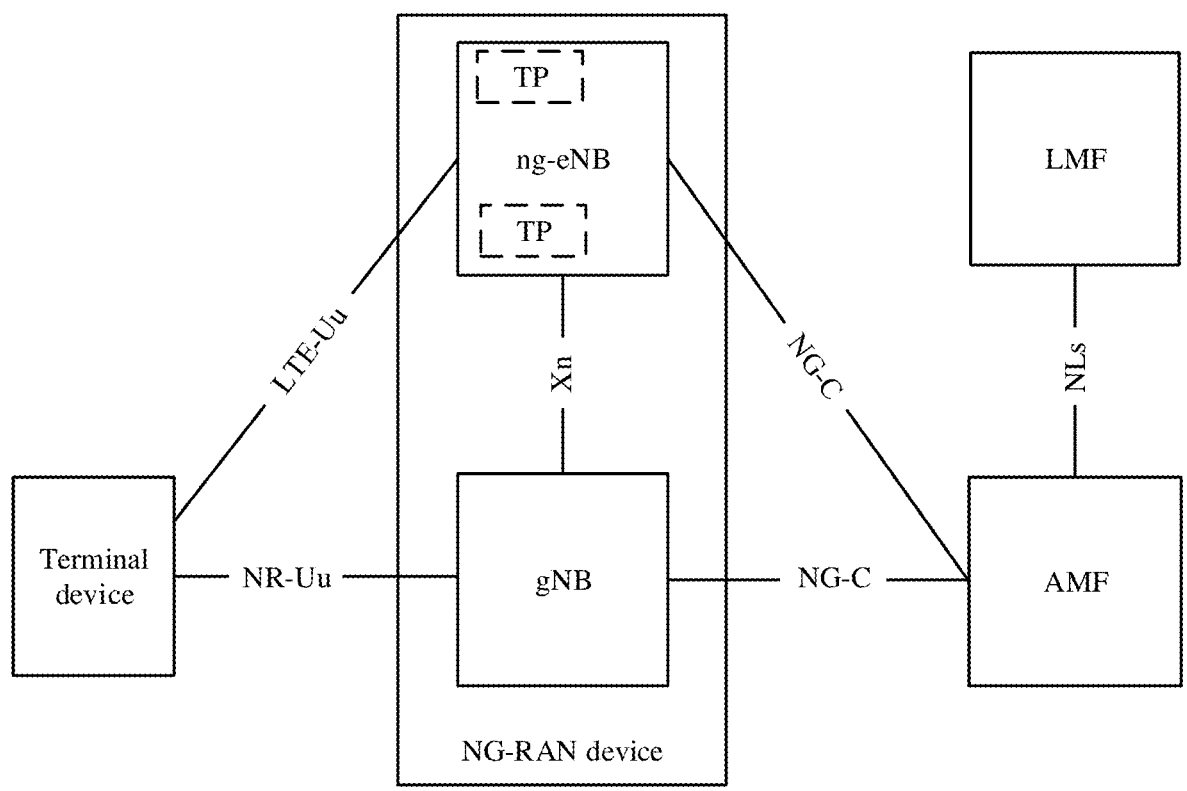
FIG. 3 is a schematic diagram 3 of a positioning system architecture according to at least one embodiment.

For example, FIG. 3 is an architectural diagram of another positioning system applied to at least one embodiment. The positioning system mainly performs positioning with the assistance of a 5G core network (5G core, 5GC), an LMF, a next-generation radio access network, and a terminal device. As shown in FIG. 3, in the positioning system, the terminal device is connected to the next-generation radio access network NG-RAN through an LTE-Uu interface and/or an NR-Uu interface respectively by using a next-generation evolved NodeB (next-generation evolved NodeB, ng-eNB) and a next-generation NodeB (generation NodeB, gNB). The next-generation radio access network NG-RAN is connected to the 5G core network (5G core, 5GC) through an NG-C interface by using an access and mobility management function AMF. The next-generation radio access network NG-RAN includes one or more next-generation LTE base stations (Next-generation eNodeB, ng-eNB) (one ng-eNB is used as an example in FIG. 3). The NG-RAN also includes one or more next-generation base stations (next-generation NodeB, gNB) (one gNB is used as an example in FIG. 3). The NG-RAN further includes one or more ng-eNBs and one or more gNBs. The ng-eNB is an LTE base station that accesses the 5G core network, and the gNB is a 5G base station that accesses the 5G core network. The 5G core network includes the access and mobility management function AMF and the location management function LMF. The AMF is configured to implement access control and mobility management, and the LMF is configured to implement a function such as positioning or positioning assistance. The AMF is connected to the LMF through an NLs interface. In the positioning architecture based on the 5G core network, functions of the functional entities are mainly as follows:

(1) The LMF supports different types of location services related to the terminal device, including locating the terminal device, transmitting assistance data to the terminal device, and the like. A control plane and a user plane of the LMF are respectively an enhanced serving mobile location center (enhanced serving mobile location center, E-SMLC) and a secure user plane location (secure user plane location, SUPL) location platform (SUPL location platform, SLP). The LMF exchanges the following information with the ng-eNB/gNB and the terminal device.

a. Exchange information with the ng-eNB/gNB by using an NR positioning protocol annex (NR positioning protocol annex, NRPPa) message, for example, obtaining positioning reference signal (positioning reference signal, PRS) configuration information, sounding reference signal (sounding reference signal, SRS) configuration information, cell timing, and cell location information.

b. Transfer terminal device capability information, auxiliary information, measurement information, and the like with the terminal device by using an LTE positioning protocol (LTE positioning protocol, LPP) message.

(2) The AMF receives a location service request related to the terminal device from a third-party device or function such as a 5G core network (5G core network, 5GC) location service (location services, LCS) entity. Alternatively, the AMF initiates some location services on behalf of a specific terminal device, and forward the location service request to the LMF. After obtaining location information returned by the terminal device, the AMF returns related location information to the third-party device or function such as the 5GC LCS entity.

(3) The terminal device measures a downlink signal from the NG-RAN device and another source to support positioning.

(4) The gNB/ng-eNB provides measurement information for the target terminal device, and transfer the information to the LMF.

Figure 4:
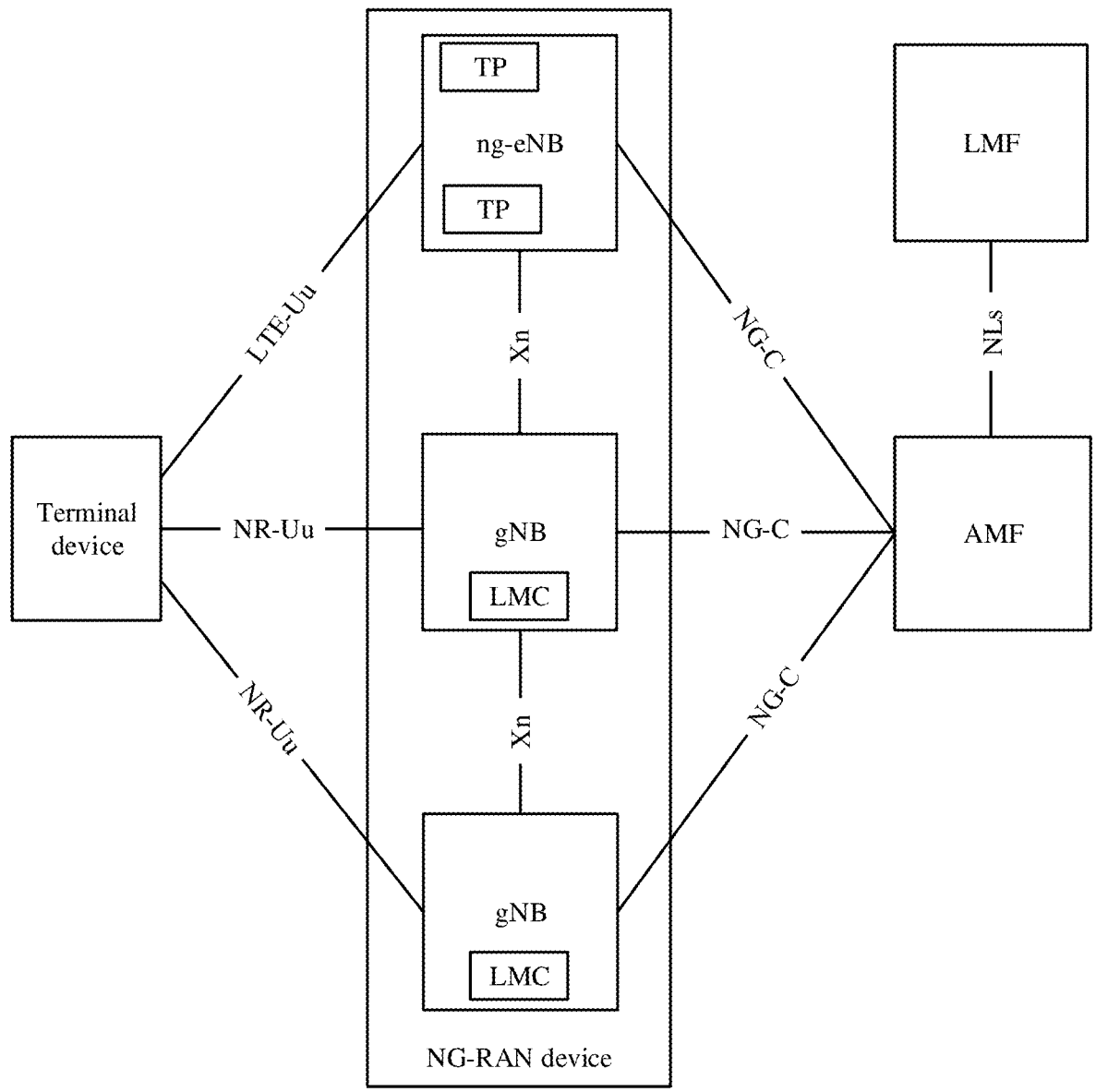
FIG. 4 is a schematic diagram 4 of a positioning system architecture according to at least one embodiment.

For example, FIG. 4 is an architectural diagram of still another positioning system applied to at least one embodiment. A difference between the positioning system architectures in FIG. 4 and FIG. 3 lies in that the apparatus or the component (for example, the LMF) that performs the location management function in FIG. 3 is deployed in a core network, and an apparatus or a component (for example, an LMC network element) that performs a location management function in FIG. 4 is deployed in an NG-RAN device. As shown in FIG. 4, a gNB includes an LMC network element. The LMC network element is a functional component of the LMF and is integrated into the gNB on the NG-RAN device.

A device or a function node in the positioning system shown in FIG. 1 to FIG. 4 is merely described as an example, and does not constitute a limitation on at least one embodiment. In practice, the positioning system in FIG. 1 to FIG. 4 further includes another network element, device, or function node that has an interaction relationship with the device or function node shown in the figure. This is not specifically limited herein.

The following explains and describes some nouns or terms used in at least one embodiment, and the nouns or terms are also used as a part of the present invention.

1. Terminal Device

The terminal device is referred to as a terminal for short, and is a device having a wireless transceiver function. The terminal device is deployed on land, where the deployment includes indoor or outdoor, or handheld or vehicle-mounted deployment, is deployed on water (for example, on a ship), or is deployed in air (for example, on aircraft, a balloon, or a satellite). The terminal device is a mobile phone (mobile phone), a tablet computer (pad), a computer having a wireless transceiver function, a virtual reality (virtual reality, VR) terminal device, an augmented reality (augmented reality, AR) terminal device, a wireless terminal device in industrial control (industrial control), a wireless terminal device in self driving (self driving), a wireless terminal device in telemedicine (remote medical), a wireless terminal device in a smart grid (smart grid), a wireless terminal device in transportation safety (transportation safety), a wireless terminal device in a smart city (smart city), or a wireless terminal device in a smart home (smart home), or alternatively is user equipment (user equipment, UE) or the like. The terminal device is alternatively a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, a vehicle-mounted device, a wearable device, a terminal device in a 5th generation (5th generation, 5G) communication system, a terminal device in a future evolved 6G communication system, or the like. The terminal device is also referred to as a terminal, an access terminal device, a vehicle-mounted terminal device, an industrial control terminal device, a UE unit, a UE station, a mobile station, a mobile console, a remote station, a remote terminal device, a mobile device, a UE terminal device, a terminal device, a wireless communication device, a UE agent, a UE apparatus, or the like. The terminal device is fixed or mobile. This is not limited in at least one embodiment.

In at least one embodiment, an apparatus configured to implement a function of a terminal device is a terminal device, or is an apparatus, for example, a chip system, that supports the terminal device to implement the function. The apparatus is mounted in the terminal device. In at least one embodiment, the chip system includes a chip, or includes a chip and another discrete component. In the technical solution provided in at least one embodiment, an example in which the apparatus for implementing the function of the terminal device is a terminal device and the terminal device is UE is used to describe the technical solution provided in at least one embodiment.

The terminal device further includes a device that provides a user with voice and/or data connectivity, for example, includes a handheld device having a wireless connection function, or a processing device connected to a wireless modem. The terminal device communicates with a core network by using a radio access network (radio access network, RAN), and exchange a voice and/or data with the RAN. The terminal device includes user equipment (user equipment, UE), a wireless terminal device, a mobile terminal device, a device-to-device (device-to-device, D2D) communication terminal device, a V2X terminal device, a machine-to-machine/machine-type communication (machine-to-machine/machine-type communications, M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device includes a mobile phone (or referred to as a "cellular" phone), a computer having a mobile terminal device, or a portable, pocket-sized, handheld, or computer built-in mobile apparatus, for example, a personal communications service (personal communications service, PCS) phone. The terminal device alternatively includes a limited device, for example, a device with low power consumption, a device with a limited storage capability, or a device with a limited computing capability, for example, an information sensing device such as a barcode, radio frequency identification (radio frequency identification, RFID), a sensor, a global positioning system (global positioning system, GPS), or a laser scanner, or a terminal device in a new evolved public land mobile network (Public Land Mobile Network, PLMN). This is not limited in at least one embodiment.

For example, the terminal device includes a radio resource control (radio resource control, RRC) signaling exchange module, a media access control (media access control, MAC) signaling exchange module, and a physical (physical, PHY) signaling exchange module. The RRC signaling exchange module is a module used by the network device and the terminal device to send and receive RRC signaling. The MAC signaling exchange module is a module used by the network device and the terminal device to send and receive MAC control element (control element, CE) signaling. PHY signaling and data is a module used by the network device and the terminal device to send and receive uplink control signaling or downlink control signaling, and uplink and downlink data or downlink data.

2. Network Device

The network device is a base station. The network device is also referred to as a radio access network (radio access network, RAN) device, and is a device that provides a wireless communication function for the terminal device. The network device, for example, includes but is not limited to: a next-generation base station (next-generation NodeB, gNB) in 5G, an evolved NodeB (evolved NodeB, eNB), a baseband unit (baseband unit, BBU), a transmitting and receiving point (transmitting and receiving point, TRP), a transmitting point (transmitting point, TP), and a mobile switching center. The network device is further a radio controller, a centralized unit (centralized unit, CU), and/or a distributed unit (distributed unit, DU) in a cloud radio access network (cloud radio access network, CRAN) scenario, or the network device is a relay station, an access point, a vehicle-mounted device, a wearable device, a network device in a 5G network, a network device in a future evolved PLMN network, or the like. The terminal device communicates with a plurality of network devices using different communication technologies. For example, the terminal device communicates with a network device supporting a long term evolution (long term evolution, LTE) system, communicates with a network device supporting 5G, or communicates with a network device, in a dual connectivity, supporting LTE and supporting 5G. This is not limited in at least one embodiment.

In at least one embodiment, an apparatus configured to implement a network device function is a network device, or is an apparatus, for example, a chip system, that supports the network device to implement the function. The apparatus is installed in the network device. In the technical solution provided in at least one embodiment, an example in which the apparatus for implementing the network device function is a network device and the network device is a base station is used to describe the technical solution provided in at least one embodiment.

The network device includes, for example, an access network (access network, AN) device, for example, a base station (for example, an access point), and is a device that is in an access network and that communicates with a wireless terminal device over an air interface through one or more cells. The base station is configured to mutually convert a received over-the-air frame and an internet protocol (IP) packet, and serve as a router between the terminal device and a remaining part of the access network. The remaining part of the access network includes an IP network. A road side unit (road side unit, RSU) is a fixed infrastructure entity that supports a vehicle to X (vehicle to X, V2X) application, and exchanges a message with another entity that supports the V2X application. The network device further coordinates attribute management of the air interface. For example, the network device includes an evolved base station (NodeB, eNB, or e-NodeB, evolutional NodeB) in an LTE system or a long term evolution-advanced (long term evolution-advanced, LTE-A) system, includes a next-generation NodeB (next-generation NodeB, gNB) in a 5th generation mobile communication technology (the 5th generation, 5G) new radio (new radio, NR) system, or includes a centralized unit (centralized unit, CU) and a distributed unit (distributed unit, DU) in a cloud access network (cloud radio access network, Cloud RAN) system. This is not limited in at least one embodiment.

For example, the network device also includes an RRC signaling exchange module, a MAC signaling exchange module, and a PHY signaling exchange module. In some deployments, the network device includes a centralized unit (centralized unit, CU) and a distributed unit (distributed unit, DU). The network device further includes an active antenna unit (active antenna unit, AAU). The CU implements some functions of the network device, and the DU implements some other functions of the network device. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements a part of processing functions of the physical layer, radio frequency processing, and a function related to an active antenna. Information at the RRC layer is eventually converted into information at the PHY layer, or is converted from information at the PHY layer. Therefore, in this architecture, higher layer signaling such as RRC layer signaling is also considered as being sent by the DU or sent by the DU and the AAU. The network device is a device including one or more of a CU node, a DU node, and an AAU node. In addition, the CU is a network device in an access network (radio access network, RAN), or the CU is a network device in a core network (core network, CN). This is not limited in at least one embodiment.

3. Location Management Device

In conclusion, the location management device locates the terminal device based on a positioning request of the AMF (positioning is also referred to as positioning measurement, and is not distinguished in at least one embodiment). In response to locating the terminal device, the location management device determines a positioning method for locating the terminal device and a network device for locating the terminal device. Optionally, the location management device in at least one embodiment is a location management function (location management function, LMF) or a location management component (location management component, LMC) network element, or is a local location management function (local location management function, LLMF) in the network device. In at least one embodiment, only an example of using the LMF as the location management device is used to describe the positioning method is descry bed herein. A location management device that is in another or a next-generation communication system and that has a function similar to that of the LMF is also included in the protection scope of at least one embodiment. This is not limited in embodiments described herein.

For example, the LMF supports different types of location services related to the target terminal device, including locating the terminal device, transmitting assistance data to the terminal device, and the like. A control plane and a user plane of the LMF are respectively an enhanced serving mobile location center (enhanced serving mobile location center, E-SMLC) and a secure user plane location (secure user plane location, SUPL) location platform (SUPL location platform, SLP). The LMF exchanges the following information with the ng-eNB/gNB and the terminal device.

a. Exchange information with the ng-eNB/gNB by using an NR positioning protocol annex (NR positioning protocol annex, NRPPa) message, for example, obtaining positioning reference signal (positioning reference signal, PRS) configuration information, sounding reference signal (sounding reference signal, SRS) configuration information, cell timing, and cell location information.

b. Transfer terminal device capability information, auxiliary information, measurement information, and the like with the terminal device by using an LTE positioning protocol (LTE positioning protocol, LPP) message.

4. Positioning Request Type

According to an initiator of a location request (or a positioning request), there are the following several positioning request types:

(1) A mobile originated location request (MO-LR scenario) is a positioning request initiated by the terminal device, and requests location-related information of the terminal device from a serving public land mobile network (public land mobile network, PLMN).

(2) A mobile terminated location request (MT-LR scenario) is a positioning request initiated by a location service (location service, LCS) client or an application function inside or outside a serving public land mobile network PLMN, and requests location-related information of the terminal device from the serving PLMN.

(3) A network induced location request (NI-LR scenario) is a positioning request initiated by an access and mobility management function (access and mobility management function, AMF), and is used to obtain location information of the terminal device for some supervision services (for example, emergency calls from the terminal device).

5. Positioning Method Type

Positioning methods are mainly classified into the following types based on different nodes that perform positioning calculation and that are of the terminal device.

(1) In a UE-based positioning method, in response to assistance data being available, the terminal device performs location calculation of the terminal device, and the terminal device further provides a measurement result related to a downlink signal.

(2) In a UE-assisted/LMF-based positioning method, the terminal device provides only a measurement result of a reference signal and does not perform location calculation. In response to assistance data being available, a location management function (location management function, LMF) is responsible for performing location calculation of the terminal device.

(3) In a standalone positioning method, in response to network assistance data being unavailable, the terminal device performs downlink signal measurement and location calculation.

6. Integrity (Integrity)

According to the 3GPP TR 22.872 protocol, the integrity is a measure of the trust, and the trust refers to a degree of trust in accuracy of information provided by a navigation system. The integrity further includes an ability of providing timely and valid warnings to the terminal device in response to a positioning system not fulfilling a condition for an intended operation.

7. Integrity-Related Key Performance Indicators (Key Performance Indicator, KPI)

Currently, for a civil aviation positioning system, there are some related indicators for evaluating integrity of the system. These indicators are also applicable to the positioning system.

(1) Alert limit (alert limit, AL): A horizontal/vertical alert limit is a maximum allowable horizontal/vertical location error. In response to the horizontal/vertical location error being exceeded, the system is not applicable to an intended application. A value of the alert limit is usually preset, and is related to a specific positioning service.

(2) Time to alert (time to alert, TTA): A maximum allowable elapsed time from when the navigation system exceeds an allowable error range to when a device generates an alarm. A value of the time to alert is usually preset, and is related to a specific positioning service.

(3) Integrity risk (integrity risk, IR): A probability that a positioning error exceeds the alert limit, that is, a probability that the integrity of the system has a risk. A value of the integrity risk is usually also preset, and is related to a specific positioning service.

(4) Protection level (protection level, PL): A horizontal/vertical protection level refers to a statistical upper bound of a positioning error in a horizontal/vertical direction. The background of this indicator is as follows: In an actual operation process, an actual position of aircraft cannot be known, and therefore an actual positioning error cannot be known. Therefore, a new parameter is to be provided to measure a possibility that the positioning error exceeds the alert limit. For example, in response to distribution of the positioning error being obtained through measurement, the indicator is calculated through Prob(PE<PL)=$\varepsilon_{PL}$, where $\varepsilon_{PL}$ is a preset threshold and is also related to a specific positioning service.

(5) Error bound (error bounding, EB): The error bound is an upper bound of the positioning error, and is used to ensure positioning accuracy.

8. Threat Model

Threat Model:

(1) Anticipated events that the system is to protect the user against.

(2) Conditions during which is used to provide reliably safe confidence bounds.

The threat model in at least one embodiment is as follows:

(1) Each threat model describes the specific nature of the threat, its magnitude, and its likelihood (namely, a probability of threat occurrence).

(2) The various threat models are to be comprehensive in describing all reasonable conditions.

(3) In response to being shown that each threat is sufficiently addressed is the system to be deemed safe.

Failure Mode:

The specific manner or way by which a failure occurs in terms of failure of the part, component, function, equipment, subsystem, or system under investigation.

9. Determining of an Operating Status of the System Based on the Integrity

Figure 5:
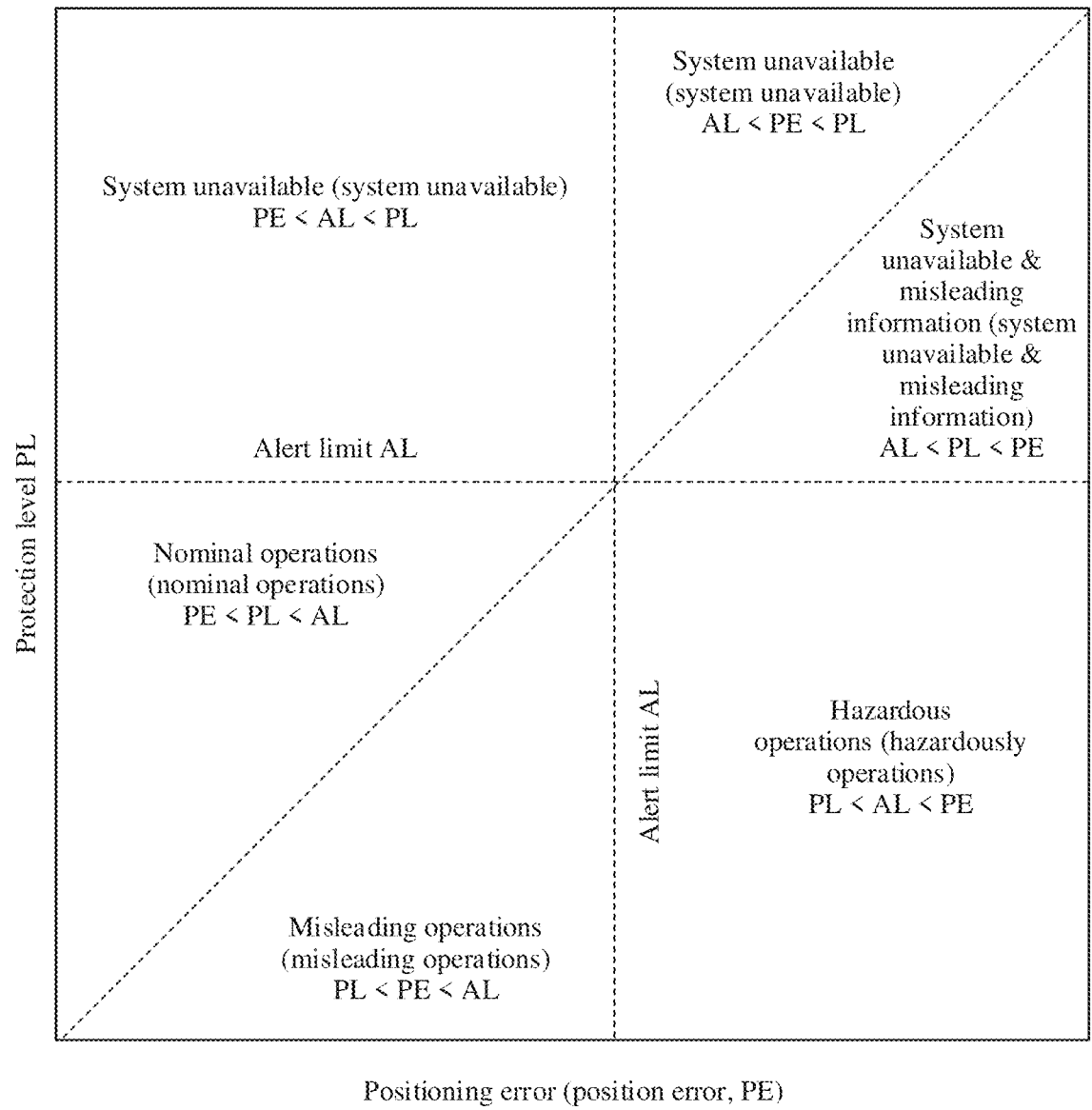
FIG. 5 is a Stanford diagram of a civil aviation system.

Currently, in a civil aviation system, an operating status of the system is determined according to a Stanford diagram (Stanford diagram) (as shown in FIG. 5). As shown in FIG. 5, the operating status of the system is determined by determining a magnitude relationship between a positioning error PE, an alert limit AL, a protection level PL, and the positioning error PE. The following conditions are included.

(1) In response to PE<AL<PL, the operating status of the system is "system unavailable (system unavailable)".

(2) In response to AL<PE<PL, the operating status of the system is "system unavailable (system unavailable)".

(3) In response to AL<PL<PE, the operating status of the system is "system unavailable & misleading information (system unavailable & misleading information)".

(4) In response to PE<PL<AL, the operating status of the system is "normal operations (nominal operations)".

(5) In response to PL<PE<AL, the operating status of the system is "misleading operations (misleading operations)".

(6) In response to PL<AL<PE, the operating status of the system is "hazardous operations (hazardously operations)".

Figure 6:
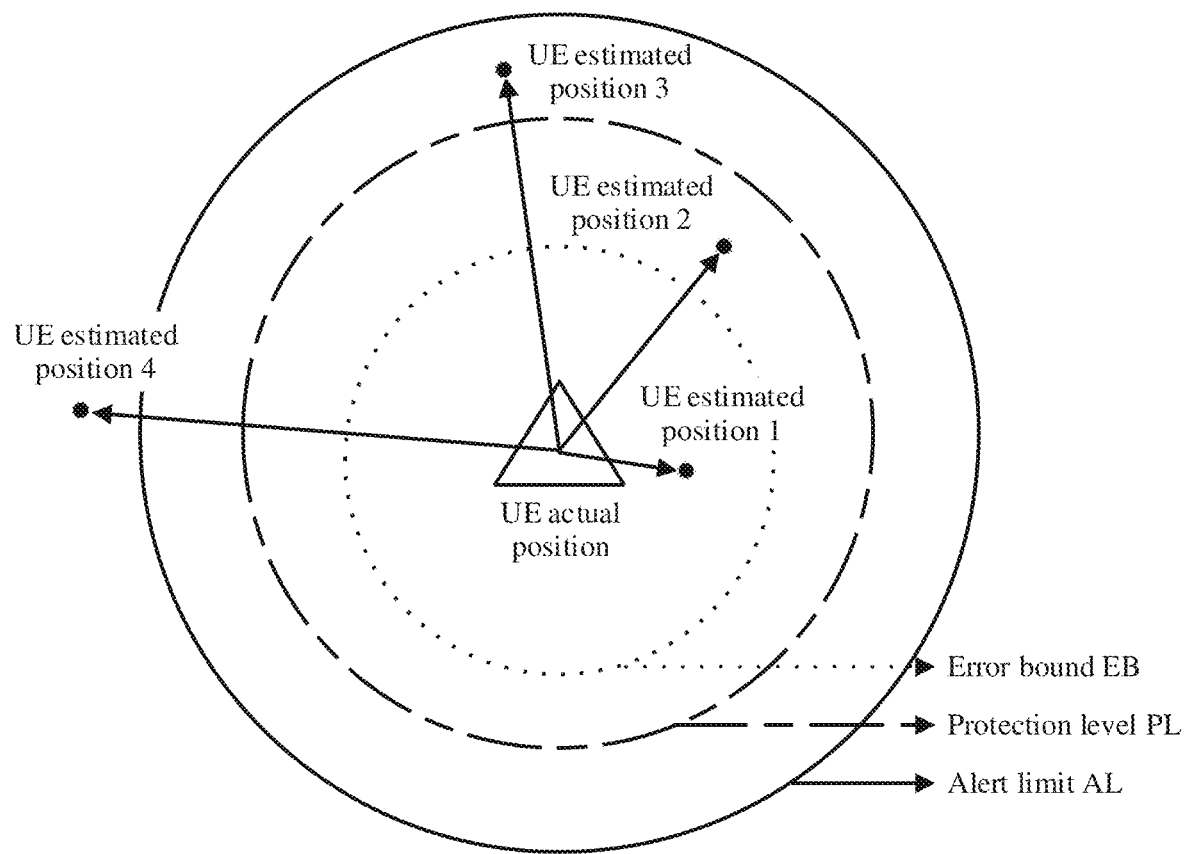
FIG. 6 shows operating statuses related to integrity in a positioning system according to at least one embodiment.

In at least one embodiment, the six integrity-related operating statues in FIG. 5 are applied to a positioning system for locating the terminal device, and four simplified operating statuses is obtained. As shown in FIG. 6, the following conditions are included.

(1) In response to PL>AL, that is, in response to the "protection level PL" of the terminal device exceeding the "alert limit AL", the operating status of the positioning system is "system unavailable (system unavailable)".

(2) In response to PE<PL<AL (at an estimated position 1 or 2), that is, in response to the "positioning error (position error, PE)" of the terminal device not exceeding an error bound corresponding to the "protection level PL", and the "protection level PL" not exceeding the "alert limit AL", the operating status of the positioning system is "nominal operations (nominal operations)".

(3) In response to PL<PE<AL (at an estimated position 3), that is, in response to the "positioning error PE" of the terminal device exceeding an error bound corresponding to the "protection level PL" but not exceeding the "alert limit AL", the operating status of the positioning system is "misleading operations (misleading operations).

(4) In response to PL<AL<PE (at an estimated position 4), that is, in response to the "protection level PL" of the terminal device not exceeding the "alert limit AL", and the "positioning error PE" exceeding the "alert limit AL", the operating status of the positioning system is "hazardous operations (hazardously operations)".

The positioning error (position error, PE) in at least one embodiment is a professional term, and specifically refers to a positioning error PE parameter related to the positioning integrity. To distinguish from a positioning error of a positioning system in a common sense, in at least one embodiment, the professional noun positioning error PE is usually described as a "positioning error PE", and a positioning error of the positioning system is described as a "system positioning error". The "system positioning error" and the "positioning error of the positioning system" have same meanings in at least one embodiment.

Currently, the LTE positioning protocol (TS 36.355) supports to report measurement quality (measurement quality) in information element (information element, IE), that is, provide location information (ProvideLocationInformation), but only a measurement error is discussed, and an error caused by another error source in the positioning process is not considered. In addition, for the existing system positioning error, the current standard lacks an alarm mechanism related to positioning errors of different systems, and cannot ensure the integrity (integrity) of the positioning system.

For the current situation that the positioning system lacks related mechanisms and implementation methods to ensure the integrity of the system, based on a definition of the integrity, at least one embodiment provides a positioning integrity evaluation mechanism, and designs an alarm method in response to an integrity risk occurring.

According to the method for controlling the positioning system integrity provided in at least one embodiment, in response to a system positioning error being large, an alarm level and an error source that correspond to the system positioning error is indicated in a corresponding message, to ensure positioning accuracy in real time and ensure high reliability of the positioning system.

Before the method for controlling the positioning system integrity provided in at least one embodiment is described, a hierarchical alarm mechanism used in response to an integrity risk occurring is briefly described. A main idea of the hierarchical alarm mechanism is to send an alarm without waiting for the positioning system to be completely unavailable (for example, in response to the protection level (protection level, PL) in the integrity-related indicators exceeding the alert limit AL), and send a warning in response to the integrity risk being about to occur in the positioning system (for example, in response to the protection level PL approaching the alert limit AL). In this way, the integrity of the positioning system is effectively ensured.

For example, based on FIG. 6, a proximity degree between the protection level PL and the alert limit AL in the integrity-related indicators is used as an example, and the four operating statuses in FIG. 6 are simplified into the following two operating statuses:

(1) In response to PL>AL, that is, in response to the "protection level PL" of the terminal device exceeding the "alert limit AL", the operating status of the positioning system is "system unavailable (system unavailable)".

(2) In response to PL<AL, that is, in response to the "protection level PL" of the terminal device not exceeding the "alert limit AL", the operating status of the positioning system is "nominal operations (nominal operations)", "misleading operations (misleading operations), or "hazardous operations (hazardously operations)".

The foregoing determining condition does not include a case of being equal to. A person skilled in the art defines the case of being equal to according to embodiments described herein. For example, the four operating statuses in FIG. 6 are simplified into the following two operating statues: (1) PL>AL, and (2) PL<AL; or (1) PL>AL, and (2) PL<AL. The case of being equal to is not limited in at least one embodiment, and details are not described again.

In response to the operating status of the positioning system being "nominal operations (nominal operations)", the system does not generate an alarm. Corresponding indication information selectively includes no-alarm information.

Figure 7:
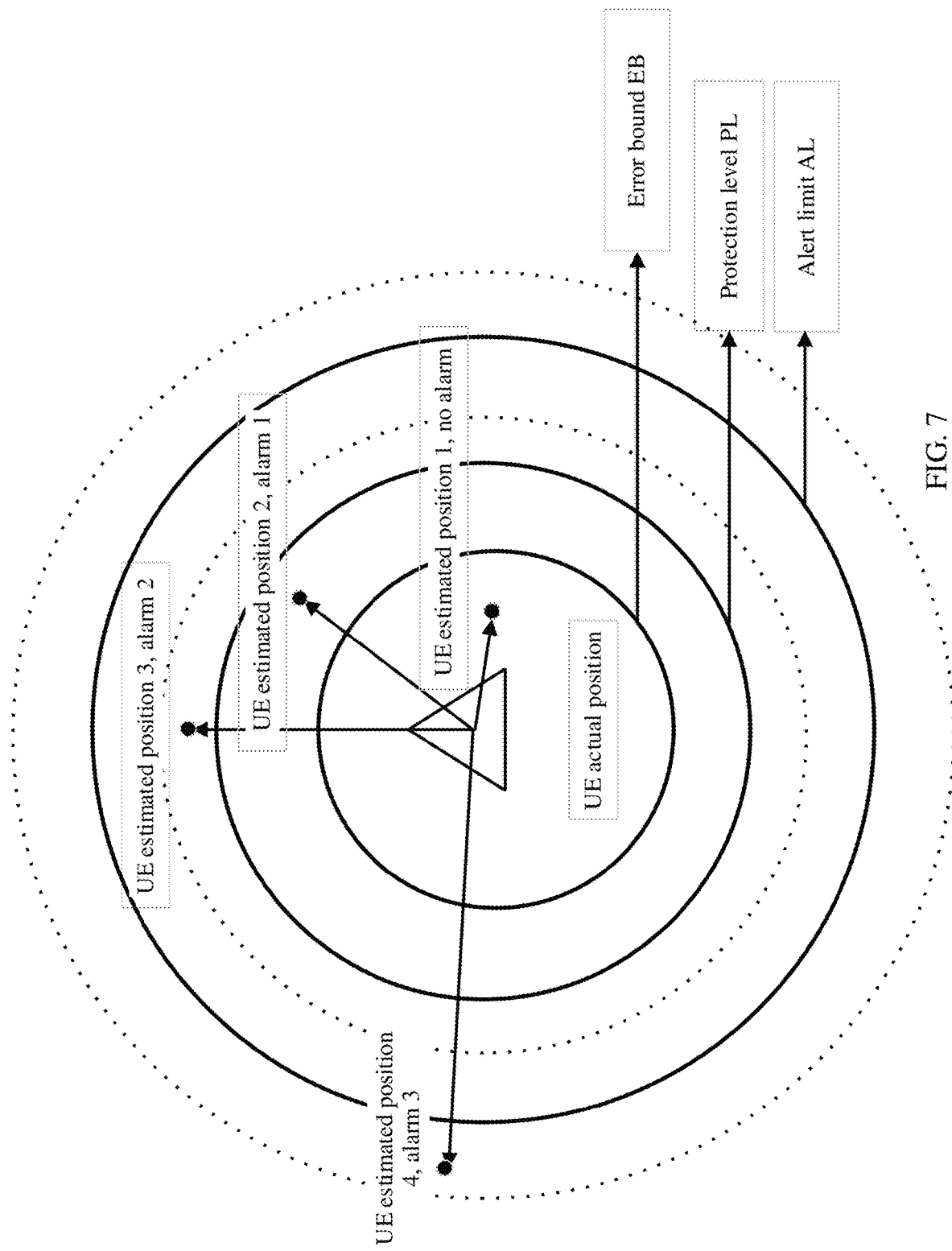
FIG. 7 is a schematic diagram of a hierarchical alarm mechanism according to at least one embodiment.

The following describes the hierarchical alarm mechanism provided in at least one embodiment based on three alarm levels corresponding to the foregoing two operating statuses. FIG. 7 shows a hierarchical alarm mechanism based on the simplified two operating statues. As shown in FIG. 7, the hierarchical alarm mechanism is as follows:

(1) Alarm level 3 (System unavailable): In response to PL>AL, the operating status of the positioning system is "system unavailable (system unavailable)".

In other words, in response to the protection level PL exceeding the alert limit AL, the positioning system is not suitable for continuing to provide a positioning service due to factors such as a large system positioning error, and the positioning system is unavailable (system unavailable). The alarm level is determined as a sub-alarm level 3, that is, the alarm level 3, which is used to indicate that the positioning system cannot operate normally (System unavailable) at this time.

(2) Alarm level 2 (High risk): In response to AL−PL∈(0, $\Delta_H$], the operating status of the positioning system is "high risk (High risk)".

In other words, in response to the protection level PL approaching the alert limit AL, and a difference between the protection level PL and the AL not exceeding a first threshold $\Delta_H$, a positioning service provided by the positioning system due to factors such as a large system positioning error has low accuracy and poor reliability. The alarm level is determined as a sub-alarm level 2, that is, the alarm level 2, which is used to indicate that the positioning system is in a high-risk state, and special attention is to be paid to accuracy of a positioning result or the operating status of the positioning system is to be adjusted in a timely manner.

(3) Alarm level 1 (Low risk): In response to AL−PL∈($\Delta_H$, $\Delta_L$], the operating status of the positioning system is "low risk (Low risk)".

In other words, in response to the protection level PL approaching the alert limit AL, and a difference between the protection level PL and the alert limit AL exceeding a first threshold $\Delta_H$ but not exceeding a second threshold $\Delta_L$, and since the positioning system has a small system positioning error, the alarm level is determined as a sub-alarm level 1, that is, the alarm level 1, which is used to indicate that the positioning system is in a low-risk state, and attention is to be paid to accuracy of a positioning result or the operating status of the positioning system is to be adjusted in a timely manner.

Values of the foregoing parameters are as follows:

(1) Protection level PL: The protection level PL is obtained through measurement, calculation, or another manner. This is not limited in at least one embodiment.

(2) Parameters such as the alert limit AL, the first threshold $\Delta_H$, and the second threshold $\Delta_L$ are all related to a specific positioning service, and is preset, or is also carried in a positioning request, for example, carried in a QoS parameter.

(3) Positioning error (position error, PE): The PE is an error distribution/statistical value obtained by considering a plurality of error sources, and different positioning error PE values is obtained according to different positioning methods. The positioning error PE is obtained through measurement, calculation, or another manner. This is not limited in at least one embodiment. An observed time difference of arrival (observed time difference of arrival, OTDOA) positioning method is used as an example. Error sources and error obtaining manners are shown in the following Table 1:

TABLE 1

| Error classification | Error source | Estimation method (if any) |
|---|---|---|
| Measurement error | PRS SINR/bandwidth/frequency/ muting, PRS network planning, and radio environment | Opt 1: Obtain error distribution, such as Gaussian distribution<br>Opt 2: Obtain a variance of errors<br>Obtain from information element IE ProvideLocationInformation-MeasQuality |
| Positioning algorithm error | Related to a measurement error and selection of a positioning reference base station (a quantity of positioning reference base stations and a geometric location of UE) | GDOP (Geometric dilution of precision) Based on a relative location between the positioning reference base station and the UE, calculate at a node (LMF/UE) that is responsible for performing positioning calculation |

TABLE 1-continued

| Error classification | Error source | Estimation method (if any) |
|---|---|---|
| Radio propagation environment | Multi-path, NLOS | Obtain from IE ProvideLocationInformation-MeasQuality (the UE reports LOS/NLOS) |
| Synchronization error | Synchronization error between positioning reference base stations | Assuming to follow random distribution within a certain range Obtain from assistance information carried in an NRPPa message |

For the positioning error PE, the protection level (protection level) and a corresponding integrity level (confidence level) is reported in information element IE NR-MeasQuality [37.355 CR] to reflect the method for controlling the positioning integrity provided in at least one embodiment. For example, features shown in Table 2 below is added to the standard [37.355 CR].

TABLE 2

```
-- ASN1START
NR-MeasQuality-r16 ::= SEQUENCE {
    timingMeasQualityValue-r16                INTEGER (0...31),
    timingMeasQualityResolution-r16   ENUMERATED {mdot1, m1, m10, m30, ...},
    protectionLevel-r17      INTEGER (0...31),
    confidenceLevel-r17 (Opt.1)               INTEGER (0...127),
Or
    confidenceLevel-r17 (Opt.2)   ENUMERATED {percent99dot9/percentdot1,
percent99dot99/percentdot01, percent99dot999/percentdot001,
percent99dot9999/percentdot0001, ...},
    ...
}
-- ASN1STOP
```

Related descriptions thereof is shown in the following Table 3.

TABLE 3

NR-MeasQuality field descriptions
protectionLevel-r17
This parameter provides the protection level corresponding to integrity.
confidenceLevel-r17
Opt 1: reuse "confidence" defined in TS 23.032, and the reserved bits (101-127) denote the confidence level, e.g., 101 - 99.9%, 102 - 99.99%, 103 - 99.999%, 104 - 99.9999%, ...
Opt 2: define a new parameter "confidenceLevel-r17" to provide the confidence level/resolution used in the Value field.

In response to the positioning integrity of the positioning system meeting one of the foregoing alarm conditions, an alarm level and/or error information of the positioning system is to be indicated in a corresponding message, for example, the sub-alarm level 2 and/or information such as the error source that causes an error and the error value, to notify the positioning system to take corresponding measures for adjustment according to different situations of the positioning integrity and risk prompts corresponding to different alarm levels, so that a system integrity is met. Generally, according to different positioning scenarios (for example, MO-LR and MT-LR) and different positioning solutions (for example, LMF-based positioning and UE-based positioning), related alarm information and/or error information is carried in different messages.

The foregoing example describes the hierarchical alarm mechanism by using the proximity degree between the protection level PL and the alert limit AL. The following describes a hierarchical alarm mechanism provided in at least one embodiment by using a proximity degree between the protection level PL, the positioning error PE, and the alert limit AL in the integrity-related indicators as an example. Still using FIG. 7 as an example, the four operating statuses in FIG. 6 are simplified into the following two operating statuses:

(1) In response to PE<PL, that is, in response to the "positioning error PE" of the terminal device not exceeding an error bound corresponding to the "protection level PL", the operating status of the positioning system is "nominal operations (nominal operation)".

(2) In response to PE>PL, that is, in response to the "positioning error PE" of the terminal device exceeding an error bound corresponding to the "protection level PL", the operating status of the positioning system is "misleading operations (misleading operations) or "hazardous operations (hazardously operations)".

The foregoing determining condition does not include a case of being equal to. A person skilled in the art defines the case of being equal to according to uses described in at least one embodiment. For example, the four operating statuses in FIG. 6 are simplified into the following two operating statues: (1) PE≤PL, and (2) PE>PL; or (1) PE<PL, and (2) PE≥PE. The case of being equal to is not limited in at least one embodiment, and details are not described again.

In response to the operating status of the positioning system being "nominal operations (nominal operations)", the system does not generate an alarm. Corresponding indication information selectively includes no-alarm information.

The following describes the hierarchical alarm mechanism provided in at least one embodiment based on two alarm levels corresponding to the foregoing two operating statuses. The hierarchical alarm mechanism is as follows:

(1) Alarm level 2 (High risk) (at an estimated position 4): In response to PL<AL<PE, the operating status of the positioning system is "hazardous operations (hazardously operations)".

In other words, in response to the "protection level PL" not exceeding the "alert limit AL", and the "alert limit AL" not exceeding the "positioning error PE", a positioning service provided by the positioning system due to factors such as a large system positioning error has low accuracy and poor reliability. The alarm level is determined as a sub-alarm level 2, that is, the alarm level 2, which is used to indicate that the positioning system is in a high-risk state, and special attention is to be paid to accuracy of a positioning result or the operating status of the positioning system is to be adjusted in a timely manner.

(2) Alarm level 1 (High risk) (at an estimated position 3): In response to PL<PE<AL, the operating status of the positioning system is "low risk (Low risk)".

In other words, in response to the "protection level PL" not exceeding the "positioning error PE" and the "positioning error PE" not exceeding the "alert limit AL", and since the positioning system has a small system positioning error, the alarm level is determined as a sub-alarm level 1, that is, the alarm level 1, which is used to indicate that the positioning system is in a low-risk state, and attention is to be paid to accuracy of a positioning result or the operating status of the positioning system is to be adjusted in a timely manner.

For values of the foregoing related parameters, refer to the value descriptions in the foregoing embodiment in which the proximity degree between the protection level PL and the alert limit AL is used as an example, and details are not described herein again.

The foregoing example describes the hierarchical alarm mechanism by using the proximity degree between the protection level PL, the positioning error PE, and the alert limit AL. The following describes a hierarchical alarm mechanism provided in at least one embodiment by using a proximity degree between the protection level PL and the positioning error PE in the integrity-related indicators as an example. Still using FIG. 7 as an example, the four operating statuses in FIG. 6 are simplified into the following two operating statuses:

(1) In response to PE<PL, that is, in response to the "positioning error PE" of the terminal device not exceeding an error bound corresponding to the "protection level PL", the operating status of the positioning system is "nominal operations (nominal operation)".

(2) In response to PL<PE, that is, in response to the "positioning error PE" of the terminal device exceeding an error bound corresponding to the "protection level PL", the operating status of the positioning system is high risk or low risk.

The foregoing determining condition does not include a case of being equal to. A person skilled in the art defines the case of being equal to according to uses described in at least one embodiment. For example, the four operating statuses in FIG. 6 are simplified into the following two operating statues: (1) PE<PL, and (2) PL≤PE; or (1) PE≤PL, and (2) PL<PE. The case of being equal to is not limited in at least one embodiment, and details are not described again.

In response to the operating status of the positioning system being "nominal operations (nominal operations)", the system does not generate an alarm. Corresponding indication information selectively includes no-alarm information.

The following describes the hierarchical alarm mechanism provided in at least one embodiment based on two alarm levels corresponding to the foregoing two operating statuses. The hierarchical alarm mechanism is as follows:

(1) Alarm level 2 (High risk): In response to PE−PL∈ $(\Delta_K, \Delta_F]$, the operating status of the positioning system is "high risk (High risk)".

In other words, in response to a difference between the protection level and the positioning error PE exceeding a third threshold $\Delta_K$ but not exceeding a fourth threshold $\Delta_F$, a positioning service provided by the positioning system due to factors such as a large system positioning error has low accuracy and poor reliability. The alarm level is determined as a sub-alarm level 2, that is, the alarm level 2, which is used to indicate that the positioning system is in a high-risk state, and special attention is to be paid to accuracy of a positioning result or the operating status of the positioning system is to be adjusted in a timely manner.

(2) Alarm level 1 (Low risk): In response to PE−PL∈(0, $\Delta_K$], the operating status of the positioning system is "low risk (Low risk)".

In other words, in response to the protection level PL approaching the positioning error PE, and a difference between the protection level PL and the positioning error PE exceeding 0 and not exceeding the third threshold $\Delta_k$, and since the positioning system has a small system positioning error, the alarm level is determined as a sub-alarm level 1, that is, the alarm level 1, which is used to indicate that the positioning system is in a low-risk state, and attention is to be paid to accuracy of a positioning result or the operating status of the positioning system is to be adjusted in a timely manner.

For values of the foregoing related parameters, refer to the value descriptions in the foregoing embodiment in which the proximity degree between the protection level PL and the alert limit AL is used as an example, and details are not described herein again. Parameters such as the third threshold $\Delta_k$ and the fourth threshold $\Delta_F$ are all related to a specific positioning service, and is preset, or is also carried in a positioning request, for example, carried in a QoS parameter.

The sub-alarm level is positively correlated to the alarm type, that is, a higher alarm level indicates a larger positioning error and a more dangerous system. Optionally, the sub-alarm level is also negatively correlated to the alarm type. This is not limited in at least one embodiment.

At least one embodiment described herein is an example of the hierarchical alarm mechanism. Other implements of the alarm mechanism are considered within the scope of embodiments described herein. This is not specifically limited in at least one embodiment.

The following describes in detail the method for controlling the positioning integrity provided in embodiments of this application with reference to FIG. 8A and FIG. 8B and FIG. 9A and FIG. 9B.

In at least one embodiment, names of messages or names of parameters in messages between devices are merely examples, and the messages or the parameters have other names in specific implementations. This is not specifically limited in at least one embodiment.

Figure 8B:
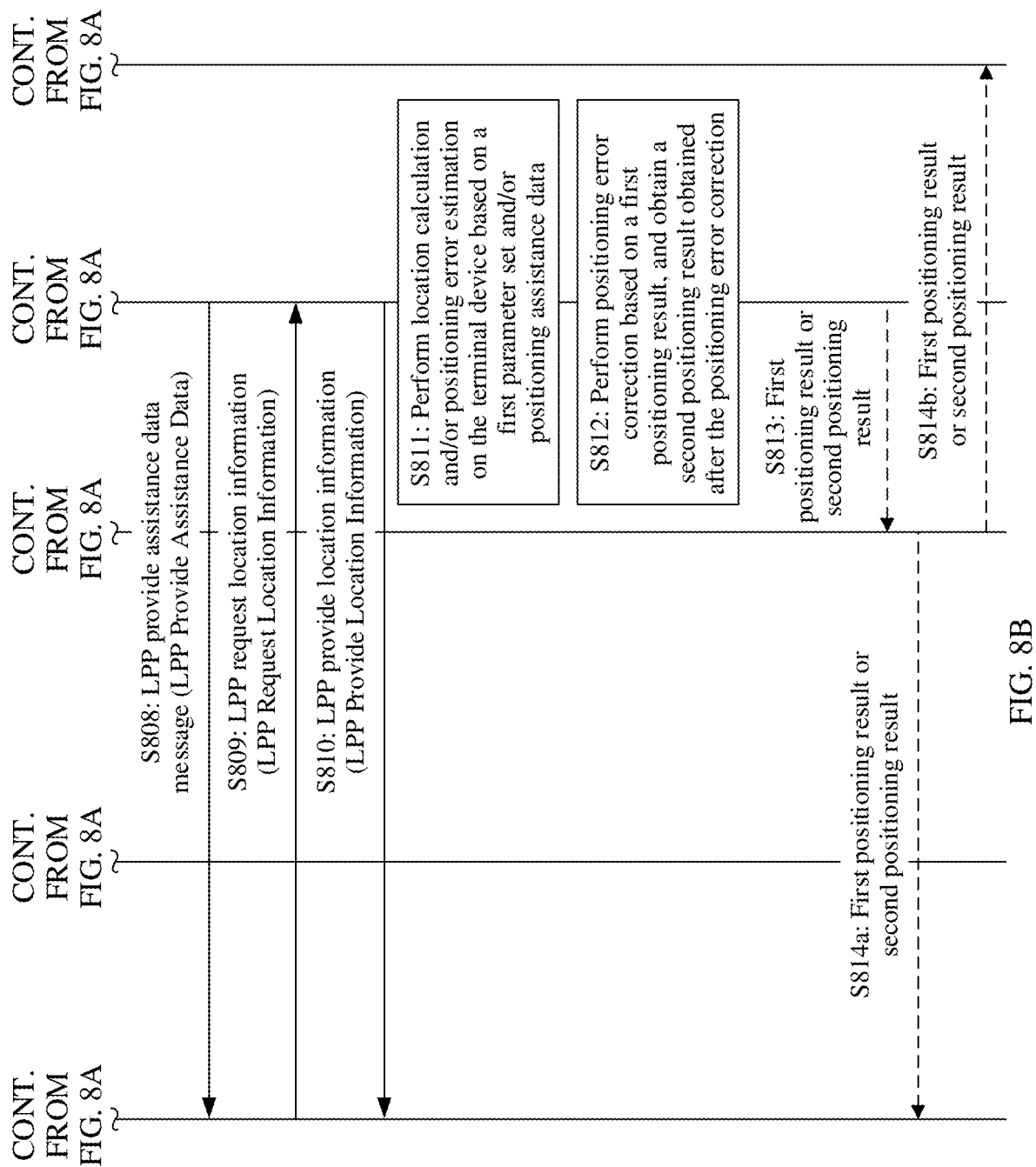

FIG. 8A and FIG. 8B are a schematic flowchart of a method 800 for controlling positioning integrity according to at least one embodiment. As shown in the figure, a location management device in FIG. 8A and FIG. 8B corresponds to the LMF in FIG. 3 or FIG. 4, or the LMC in FIG. 4. A terminal device in FIG. 8A and FIG. 8B corresponds to the UE in FIG. 3 or FIG. 4. A network device in FIG. 8A and FIG. 8B corresponds to the ng-eNB or the gNB in FIG. 3 or FIG. 4. An access and mobility management device in FIG. 8A and FIG. 8B corresponds to the AMF in FIG. 3 or FIG. 4. This embodiment describes a control method that is designed based on a UE-assisted/LMF-based positioning solution and that ensures the positioning integrity. This method is applied to the foregoing MO-LR, MT-LR, or NI-LR positioning scenarios. In the UE-assisted/LMF-based positioning solution, in response to there being assistance data, the terminal device provides only a measurement result of a reference signal, and does not perform location calculation. The location management device performs location calculation of the terminal device. The method 800 for controlling the positioning integrity includes at least the following steps.

In at least one embodiment, a positioning procedure is initiated by using the following step S801*a*, S801*b*, or S801*c*.

S801*a*: The terminal device sends a positioning request to the access and mobility management device. Correspondingly, the access and mobility management device receives the positioning request from the terminal device. The positioning request requests to locate the terminal device.

In other words, the terminal device initiates the procedure for locating the terminal device, and this step is applied to the MO-LR positioning scenario.

The positioning request is also referred to as a location service request in at least on embodiment. Optionally, indication information related to the positioning integrity is indicated in the positioning request. The indication information includes at least one or more of the following information: a protection level PL, an alert limit AL, an integrity risk IR, a time to alert TTA, an error source, an error value, an integrity level, a threat model, a threat occurrence rate, a failure mode, and the like. For example, one or more of the following information is indicated in a QoS parameter of the positioning request: a protection level PL, an alert limit AL, an integrity risk IR, a time to alert TTA, an error source, an error value, an integrity level, a threat model, a threat occurrence rate, a failure mode, and the like.

S801*b*: A third-party device or function sends a positioning request to the access and mobility management device. Correspondingly, the access and mobility management device receives the positioning request from the third-party device or function. The positioning request requests to locate the terminal device.

In other words, the third-party device or function initiates the procedure for locating the terminal device, and this step is applied to the MT-LR positioning scenario.

Optionally, the third-party device or function is a 5G core network (5G core, 5GC) location service (location services, LCS) entity, an LCS client, an application function inside/out of a serving PLMN, or the like. For example, the 5GC LCS entity in at least one embodiment is, for example, a gateway mobile positioning center (gateway mobile location center, GMLC).

Optionally, indication information related to the positioning integrity is indicated in the positioning request. The indication information includes at least one or more of the following information: a protection level PL, an alert limit AL, an integrity risk IR, a time to alert TTA, an error source, an error value, an integrity level, a threat model, a threat occurrence rate, a failure mode, and the like. For example, one or more of the following information is indicated in a QoS parameter of the positioning request: a protection level PL, an alert limit AL, an integrity risk IR, a time to alert TTA, an error source, an error value, an integrity level, a threat model, a threat occurrence rate, a failure mode, and the like.

S801*c*: The access and mobility management device determines some positioning service parameters of the terminal device (for example, the terminal device is to make an emergency call), and triggers a positioning request.

In other words, the access and mobility management device initiates the procedure for locating the terminal device, and this step is applied to the NI-LR positioning scenario.

Optionally, indication information related to the positioning integrity is indicated in the positioning request. The indication information includes at least one or more of the following information: a protection level PL, an alert limit AL, an integrity risk IR, a time to alert TTA, an error source, an error value, an integrity level, a threat model, a threat occurrence rate, a failure mode, and the like. For example, one or more of the following information is indicated in a QoS parameter of the positioning request: a protection level PL, an alert limit AL, an integrity risk IR, a time to alert TTA, an error source, an error value, an integrity level, a threat model, a threat occurrence rate, a failure mode, and the like.

The foregoing provides only examples of several manners of initiating the positioning procedure, and there is another manner of initiating the positioning procedure. This is not specifically limited in at least one embodiment.

Before step S801*a*, S801*b*, or S801*c* in at least one embodiment is performed, the method for controlling the positioning integrity provided in at least on embodiment further includes offline steps, that is, steps that are performed before a positioning procedure of a terminal device is started. The offline steps that are performed before step S801*a*, S801*b*, or S801*c* are not specifically described in at least one embodiment, and performing manners of these steps are not specifically limited either. A person skilled in the art is able to refer to an existing technique process.

Further, the method for controlling the positioning integrity provided in at least one embodiment further includes the following steps S802 to S808.

S802: The access and mobility management device sends a positioning request to the location management device. Correspondingly, the location management device receives the positioning request from the access and mobility management device. The positioning request requests to locate the terminal device.

Optionally, indication information related to the positioning integrity is indicated in the positioning request. The indication information includes at least one or more of the following information: a protection level PL, an alert limit AL, an integrity risk IR, a time to alert TTA, an error source, an error value, an integrity level, a threat model, a threat occurrence rate, a failure mode, and the like. For example, one or more of the following information is indicated in a QoS parameter of the positioning request: a protection level PL, an alert limit AL, an integrity risk IR, a time to alert TTA, an error source, an error value, an integrity level, a threat model, a threat occurrence rate, a failure mode, and the like.

The positioning request sent by the access and mobility management device to the location management device is the positioning request in step S801*a*, S801*b*, or S801*c*.

S803: The location management device sends a first request message to the terminal device. Correspondingly, the terminal device receives the first request message from the location management device. The first request message requests a positioning capability of the terminal device.

Optionally, the first request message is carried in an LTE positioning protocol (LTE positioning protocol, LPP) message, that is, the location management device requests the positioning capability from the terminal device by using an LPP message 1. For example, as shown in FIG. 8A and FIG. 8B, the LPP message 1 is, for example, an LPP request capability (LPP Request Capabilities) message.

S804: The terminal device sends a first response message to the location management device. Correspondingly, the location management device receives the first response message from the terminal device. The first response message carries or includes the positioning capability of the terminal device.

Optionally, the first response message is carried in the LTE positioning protocol (LTE positioning protocol, LPP) message, that is, the terminal device sends the positioning capability of the terminal device to the location management device by using an LPP message 2. For example, as shown in FIG. 8A and FIG. 8B, the LPP message 2 is, for example, an LPP provide capability (LPP Provide Capabilities) message.

For example, in at least one embodiment, the positioning capability of the terminal device is, for example, whether to support control or measurement related to the positioning integrity, for example, measurement on one or more of parameters such as an alert limit AL, a time to alert TTA, or an integrity risk IR in integrity-related KPIs, or measurement on one or more of parameters such as an error source, an error value, an integrity level, a threat model, a threat occurrence rate, and a failure mode in integrity-related KPIs. This is not specifically limited in at least one embodiment.

Optionally, different from the manner of obtaining the positioning capability of the terminal device in steps S803 and S804, in at least one embodiment, the terminal device actively sends the positioning capability of the terminal device to the location management device without requesting. In other words, in response to the method for controlling the positioning integrity provided in this embodiment being performed, step S803 is omitted. This is not specifically limited in at least one embodiment.

S805: The location management device sends a second request message to a next-generation radio access network (next-generation radio access network, NG-RAN).

Correspondingly, the NG-RAN device receives the second request message from the location management device. The second request message requests positioning assistance data.

Optionally, the second request message is carried in an NR positioning protocol (NR positioning protocol annex, NRPPa) message. In other words, the location management device requests the positioning assistance data from the NG-RAN device by using an NRPPa message 1. For example, as shown in FIG. 8A and FIG. 8B, the NRPPa message 1 is, for example, an NRPPa information request (NRPPa Information Request) message.

For example, the positioning assistance data is location information of a network device (for example, the ng-eNB or the gNB in FIG. 3, FIG. 4, or FIG. 8A and FIG. 8B) participating in positioning in the NG-RAN device, for example, a physical cell ID (physical cell IDs, PCIs), a global cell ID (global cell IDs, GCIs), a TP ID, PRS configuration information, or other assistance information related to the positioning integrity control. This is not limited in at least on embodiment. In FIG. 8A and FIG. 8B, the ng-eNB or the gNB that participates in positioning is located in the NG-RAN device.

S806: The NG-RAN sends a second response message to the location management device. Correspondingly, the location management device receives the second response message from the NG-RAN device. The second response message carries or includes the positioning assistance data provided by the NG-RAN device for the location management device.

Optionally, the second response message is carried in the NR positioning protocol (NR positioning protocol annex, NRPPa) message. In other words, the NG-RAN sends the positioning assistance data to the location management device by using an NRPPa message 2. For example, as shown in FIG. 8A and FIG. 8B, the NRPPa message 2 is, for example, an NRPPa information response (NRPPa Information Response) message.

In at least one embodiment, the positioning assistance data provided by the NG-RAN device to the location management device not only includes the location information, the related configuration information, and the like of the network device that participates in positioning in the NG-RAN device, but also include other assistance data that is provided by the NG-RAN device to the location management device and that is used to assist in positioning, for example, location information of another related device in the NG-RAN, or other assistance information related to the positioning integrity control. This is not specifically limited in at least one embodiment.

Optionally, different from the manner of obtaining the positioning assistance data in steps S705 and S706, in at least one embodiment, the NG-RAN device actively sends, without requesting, to the location management device by using the NRPPa message, the positioning assistance data that is provided by the NG-RAN for the location management device. In other words, in response to the method for controlling the positioning integrity provided in this embodiment being performed, step S705 is omitted. This is not specifically limited in at least one embodiment.

S807: The terminal device sends a third request message to the location management device. Correspondingly, the location management device receives the third request message from the terminal device. The third request message requests positioning assistance data.

Optionally, the third request message is carried in the LTE positioning protocol (LTE positioning protocol, LPP) message. In other words, the terminal device requests the positioning assistance data from the location management device by using an LPP message 3. For example, as shown in FIG. 8A and FIG. 8B, the LPP message 3 is, for example, an LPP request assistance data (LPP Request Assistance Data) message.

S808: The location management device sends a third response message to the terminal device. Correspondingly, the terminal device receives the third response message from the location management device. The third response message carries or includes the positioning assistance data provided by the location management device for the terminal device.

Optionally, the third response message is carried in the LTE positioning protocol (LTE positioning protocol, LPP) message. In other words, the location management device sends the positioning assistance data to the terminal device by using an LPP message 4. For example, as shown in FIG. 8A and FIG. 8B, the LPP message 4 is, for example, an LPP provide assistance data (LPP Provide Assistance Data) message.

In at least one embodiment, the positioning assistance data provided by the location management device for the terminal device not only includes the positioning assistance data provided by the NG-RAN device for the location management device, but also includes other assistance data (for example, assistance data that is obtained by the location management device from another gateway) that is provided by the location management device for the terminal device, such as a physical cell ID (physical cell IDs, PCIs), a global cell ID (global cell IDs, GCIs), a TP ID, PRS configuration information, or other assistance information related to the positioning integrity. This is not specifically limited in at least one embodiment.

Optionally, different from the manner of obtaining the positioning assistance data in steps S807 and S808, in at least one embodiment, the location management device provides the positioning assistance data to the terminal device without requesting. In other words, in response to the method for controlling the positioning integrity provided in this embodiment being performed, step S807 is omitted. This is not specifically limited in at least one embodiment.

The foregoing steps S801 to S808 merely provide an example of a procedure in which a network device participates in response to the terminal device obtaining the positioning assistance data in the method for controlling the positioning integrity. Certainly, in the method for controlling the positioning integrity provided in at least on embodiment, the terminal device obtains a plurality of groups of positioning assistance data. In this case, participation of a plurality of network devices is used. For a processing and interaction procedure (not shown in FIG. 8A and FIG. 8B) of each network device, refer to the processing and the related interaction procedure of the NG-RAN device in the foregoing steps S801 to S808. Details are not described herein again.

Further, the positioning method provided in at least one embodiment further includes the following steps S809 to S811.

S809: The location management device sends a fourth request message to the terminal device. Correspondingly, the terminal device receives the fourth request message from the location management device. The fourth request message requests a first parameter set.

Optionally, the fourth request message is carried in the LTE positioning protocol (LTE positioning protocol, LPP) message, that is, the location management device requests a positioning measurement parameter from the terminal device by using an LPP message 5. For example, as shown in FIG. 8A and FIG. 8B, the LPP message 5 is, for example, LPP request location information (LPP Request Location Information).

The first parameter set is a positioning measurement result obtained by the terminal device by measuring a reference signal. The first parameter set includes measurement information and/or error information that are/is related to location information of the terminal device, the error information is related to positioning integrity, and the error information includes at least one or more of the following information: a protection level, an error source, an error value, an integrity level, a threat model, a threat occurrence rate, and a failure mode.

S810: The terminal device sends a fourth response message to the location management device. Correspondingly, the location management device receives the fourth response message from the terminal device. The fourth response message carries or includes the first parameter set.

Optionally, the fourth response message is carried in the LTE positioning protocol (LTE positioning protocol, LPP) message, that is, the terminal device sends the first parameter set to the location management device by using an LPP message 6. For example, as shown in FIG. 8A and FIG. 8B, the LPP message 6 is, for example, LPP provide location information (LPP Provide Location Information).

Optionally, different from the manner of obtaining the first parameter set in steps S909 to S911, in at least one embodiment, the terminal device actively sends the first parameter set to the location management device without requesting. In other words, in response to the method for controlling the positioning integrity provided in this embodiment being performed, step S909 is omitted. This is not specifically limited in at least one embodiment.

S811: The location management device performs location calculation and/or positioning error estimation on the terminal device based on the first parameter set and/or the positioning assistance data.

In at least one embodiment, the location management device obtains a first positioning result based on the first parameter set and/or positioning assistance data, where the first positioning result includes location information and/or integrity information of the terminal device, and the integrity information includes the error information and/or alarm information. The error information is related to the positioning integrity, and the error information includes at least one or more of the following information: a protection level, an error source, an error value, a positioning error PE, an integrity level, a threat model, a threat occurrence rate, and a failure mode. The alarm information includes a determining result obtained by comparing the first positioning result with a preset determining condition, and the determining result includes at least one or more of the following information: information about whether an alarm is to be used, an alarm level corresponding to the first positioning result, and the error information.

For example, the error information obtained by the location management device includes a measurement result of a protection level PL. The PL is compared with related parameters of the positioning integrity: an alert limit AL, a time to alert TTA, an integrity risk IR, a positioning error PE, and the like, to obtain an evaluation of the positioning integrity, thereby ensuring the positioning integrity of the positioning system. The parameters such as the alert limit AL, the time to alert TTA, and the integrity risk IR are preset, and are related to a specific positioning service. The positioning error PE is obtained through calculation, pre-configuration, or measurement.

The parameter related to the positioning integrity control, for example, the protection level PL, is calculated by the terminal device, and then included in the first parameter set and sent to the location management device. Alternatively, the location management device performs calculation based on another parameter in the first parameter set and/or the positioning assistance data. This is not limited in at least on embodiment. In response to the parameter related to the positioning integrity control being calculated by the terminal device, the location management device determines, based on a calculated value reported by the terminal device, whether an alarm is used. In response to the parameter related to the positioning integrity control being calculated by the location management device, the location management device first calculates the parameter related to the positioning integrity control, and then determines whether an alarm is used.

In at least one embodiment, the determining result includes: in response to the first positioning result meeting the preset determining condition, the determining result includes at least one or more of the following information: the alarm information, the alarm level corresponding to the first positioning result, and the error information; and in response to the first positioning result not meeting the preset determining condition, the determining result includes no-alarm information or does not include alarm information, that is, the determining result selectively includes no-alarm information.

For example, in response to the first positioning result meeting a preset determining condition 1, the determining result includes the alarm information; or in response to the first positioning result meeting a preset determining condition 1, the determining result includes the alarm level corresponding to the first positioning result; or in response to the first positioning result meeting a preset determining condition 1, the determining result includes the error information; or in response to the first positioning result meeting a preset determining condition 1, the determining result includes the alarm information and the alarm level corresponding to the first positioning result; or in response to the first positioning result meeting a preset determining condition 1, the determining result includes the alarm information and the error information; or in response to the first positioning result meeting a preset determining condition 1, the determining result includes the alarm information, the alarm level corresponding to the first positioning result, and the error information. In response to the first positioning result not meeting the preset determining condition 1, the determining result includes information about that no alarm is used, or the determining result does not include any alarm information, that is, the determining result selectively includes no-alarm information.

In at least one embodiment, the determining result includes: in response to the first positioning result not meeting the preset determining condition, the determining result includes at least one or more of the following information: the alarm information, the alarm level corresponding to the first positioning result, and the error information; and in response to the first positioning result meeting the preset determining condition, the determining result includes no-alarm information or does not include alarm information, that is, the determining result selectively includes no-alarm information.

For example, in response to the first positioning result not meeting a preset determining condition 2, the determining result includes the alarm information; or in response to the first positioning result not meeting a preset determining condition 2, the determining result includes the alarm level corresponding to the first positioning result; or in response to the first positioning result not meeting a preset determining condition 2, the determining result includes the error information; or in response to the first positioning result not meeting a preset determining condition 2, the determining result includes the alarm information and the alarm level corresponding to the first positioning result; or in response to the first positioning result not meeting a preset determining condition 2, the determining result includes the alarm information and the error information; or in response to the first positioning result not meeting a preset determining condition 2, the determining result includes the alarm information, the alarm level corresponding to the first positioning result, and the error information. In response to the first positioning result meeting the preset determining condition 2, the determining result includes information about that no alarm is used, or the determining result does not include any alarm information, that is, the determining result selectively includes no-alarm information.

In at least one embodiment, the preset determining condition includes one or more sub-determining conditions, and the alarm level also includes one or more sub-alarm levels. One sub-alarm level corresponds to the one or more sub-determining conditions. For example, a first alarm level is determined in response to a first sub-determining condition and a second sub-determining condition being met, or a first alarm level is determined in response to a first sub-determining condition or a second sub-determining condition not being met. Alternatively, the one or more sub-alarm levels correspond to one sub-determining condition. For example, a first alarm level and a second alarm level is determined in response to a first sub-determining condition being met, and the second alarm level is determined in response to the second sub-determining condition being met again, or a first alarm level and a second alarm level is determined in response to a first sub-determining condition not being met, and the second alarm level is determined in response to the second sub-determining condition not being met again. The determining result includes at least one or more of the following information: information about whether an alarm is used, a sub-alarm level corresponding to the first positioning result, the error information, and the like.

For example, a proximity degree between the protection level PL and the alert limit AL in the integrity-related indicators is used as an example to perform positioning integrity estimation on the operating status of the positioning system, to determine whether an alarm is to be generated. As shown in FIG. 6, an example in which the preset determining condition includes three sub-determining conditions and the alarm level includes three sub-alarm levels is used to describe the hierarchical alarm mechanism provided in at least on embodiment. For example, the three sub-determining conditions is as follows:

(1) PL>AL;
(2) AL−PL∈(0, $\Delta_H$]; and
(3) AL−PL∈($\Delta_H$,$\Delta_L$].

(1) PL>AL.

In response to positioning integrity of the first positioning result meeting the first sub-determining condition PL>AL, the operating status of the positioning system is "system unavailable (system unavailable)". In other words, in response to the protection level PL exceeding the alert limit AL, the positioning system is not suitable for continuing to provide a positioning service due to factors such as a large system positioning error, and the positioning system is unavailable (system unavailable). The alarm level is determined as a sub-alarm level 3 (the highest sub-alarm level), that is, the alarm level 3, which is used to indicate that the positioning system cannot operate normally (System unavailable) at this time. The determining result includes at least one or more of the following information: the alarm information, a third sub-alarm level corresponding to the first positioning result, and the error information.

(2) AL−PL∈(0, $\Delta_H$].

In response to positioning integrity of the first positioning result meeting the second sub-determining condition L−PL∈(0, $\Delta_H$], the operating status of the positioning system is "high risk (High risk)". In other words, in response to the protection level PL approaching the alert limit AL, and a difference between the protection level PL and the AL does not exceed a first threshold OH, a positioning service provided by the positioning system due to factors such as a large system positioning error has low accuracy and poor reliability. The alarm level is determined as a sub-alarm level 2 (the second highest sub-alarm level), that is, the alarm level 2, which is used to indicate that the positioning system is in a high-risk state, and special attention is to be paid to accuracy of a positioning result or the operating status of the positioning system is to be adjusted in a timely manner. The determining result includes at least one or more of the following information: the alarm information, a second sub-alarm level corresponding to the first positioning result, and the error information.

(3) AL−PL∈($\Delta_H, \Delta_L$).

In response to positioning integrity of the first positioning result meeting the first sub-determining condition AL−PL∈ ($\Delta_H$, $\Delta_L$], the operating status of the positioning system is "low risk (Low risk)". In other words, in response to the protection level PL approaching the alert limit AL, and a difference between the protection level PL and the alert limit AL exceeds a first threshold $\Delta_H$ but does not exceed a second threshold $\Delta_L$, and since the positioning system has a small system positioning error, the alarm level is determined as a sub-alarm level 1 (the lowest sub-alarm level), that is, the alarm level 1, which is used to indicate that the positioning system is in a low-risk state, and attention is to be paid to accuracy of a positioning result or the operating status of the positioning system is to be adjusted in a timely manner. The determining result includes at least one or more of the following information: the alarm information, a first sub-alarm level corresponding to the first positioning result, and the error information.

The alert limit AL is a horizontal/vertical alert limit, and is a maximum allowable horizontal/vertical location error. In response to the horizontal error being exceeded, the system is not applicable to an intended application. A value of this indicator is usually preset, and is related to a specific positioning service. The protection level PL is obtained through measurement, calculation, or another manner. This is not limited in at least on embodiment. The positioning error PE is an error distribution/statistical value obtained by considering a plurality of error sources, and different positioning error PE values is obtained according to different positioning methods. The positioning error PE is obtained through measurement, calculation, or another manner. This is not limited in at least on embodiment. The first threshold $\Delta_H$ and the second threshold $\Delta_L$ are all related to a specific positioning service, and is preset, or is also carried in a QoS parameter of a positioning request.

For example, the hierarchical alarm mechanism provided in at least on embodiment is further described by using a proximity degree between the protection level PL, the positioning error PE, and the alert limit AL in the integrity-related indicators as an example to perform positioning integrity estimation on the operating status of the positioning system, to determine whether an alarm is to be generated. As shown in FIG. 8A and FIG. 8B, an example in which the preset determining condition includes two sub-determining conditions and the alarm level includes two sub-alarm levels is used to describe the hierarchical alarm mechanism provided in at least on embodiment. For example, the two sub-determining conditions is as follows:

(1) PL<AL<PE; and
(2) PL<PE<AL.
(1) PL<AL<PE.

In response to positioning integrity of the first positioning result meeting the first sub-determining condition PL<AL<PE, the operating status of the positioning system is "high risk (hazardously operations)". In other words, in response to the "protection level PL" not exceeding the "alert limit AL", and the "alert limit AL" not exceeding the "positioning error PE", a positioning service provided by the positioning system due to factors such as a large system positioning error has low accuracy and poor reliability. The alarm level is determined as a sub-alarm level 2, that is, the alarm level 2, which is used to indicate that the positioning system is in a high-risk state, and special attention is to be paid to accuracy of a positioning result or the operating status of the positioning system is to be adjusted in a timely manner. The determining result includes at least one or more of the following information: the alarm information, a second sub-alarm level corresponding to the first positioning result, and the error information.

(2) PL<PE<AL.

In response to positioning integrity of the first positioning result meeting the second sub-determining condition PL<PE<AL, the operating status of the positioning system is "low risk (Low risk)".

In other words, in response to the "protection level PL" not exceeding the "positioning error PE" and the "positioning error PE" not exceeding the "alert limit AL", and since the positioning system has a small system positioning error, the alarm level is determined as a sub-alarm level 1, that is, the alarm level 1, which is used to indicate that the positioning system is in a low-risk state, and attention is to be paid to accuracy of a positioning result or the operating status of the positioning system is to be adjusted in a timely manner. The determining result includes at least one or more of the following information: the alarm information, a first sub-alarm level corresponding to the first positioning result, and the error information.

In response to PE<PL, that is, in response to the "positioning error PE" of the terminal device not exceeding an error bound corresponding to the "protection level PL", the operating status of the positioning system is "nominal operations (nominal operation)". In this case, the positioning system is able to not generate an alarm. Corresponding indication information selectively includes no-alarm information.

The hierarchical alarm mechanism proposed in at least on embodiment is alternatively based on comparison of another positioning integrity related parameter or another correspondence form between a sub-alarm level and a sub-determining condition. This is not limited in at least on embodiment.

The location management device performs location calculation and/or positioning error estimation on the terminal device based on the first parameter set and/or the positioning assistance data. The integrity information in the first positioning result is mainly used for positioning error estimation, and is compared with the preset determining condition based on the first positioning result. In response to the first positioning result meeting or not meeting the preset determining condition, corresponding alarm information is provided. According to the method for controlling the positioning integrity provided in at least on embodiment, a feasible implementation method is provided to ensure the positioning integrity in the positioning process, so that an alarm level and an error source is indicated in a corresponding message in response to a positioning error being large.

Based on the positioning integrity control, optionally, the method for controlling the positioning integrity provided in at least one embodiment further includes the following step S812:

S812: The location management device performs positioning error correction based on the first positioning result, and obtains a second positioning result obtained after the positioning error correction.

Optionally, the terminal device performs positioning error correction on location information of the terminal device based on error information included in the first positioning result, for example, parameters such as an error source, an error value, or a positioning error PE, and obtain a second positioning result obtained after the positioning error correction, where the second positioning result includes location information and/or integrity information, of the terminal device, obtained after the positioning error correction.

Optionally, in at least one embodiment, based on different manners of initiating the positioning procedure, the positioning method further includes the following step S813.

S813: The location management device sends a first positioning result or a second positioning result to the access and mobility management device. Correspondingly, the access and mobility management device receives the first positioning result or the second positioning result from the terminal device of the location management device.

In response to step S812 not being performed, the location management device sends a first positioning result to the access and mobility management device, where the first positioning result includes location information and/or integrity information of the terminal device, and the integrity information includes the error information and/or alarm information. The error information is related to positioning integrity, and the error information includes at least one or more of the following information: a protection level, an error source, an error value, a positioning error PE, an integrity level, a threat model, a threat occurrence rate, and a failure mode. The alarm information includes a determining result obtained by comparing the first positioning result with a preset determining condition, and the determining result includes at least one or more of the following information: information about whether an alarm is to be generated, an alarm level corresponding to the first positioning result, and the error information.

If step S812 is performed, the location management device sends a second positioning result to the access and mobility management device, where the second positioning result includes location information and/or integrity information, of the terminal device, obtained after the positioning error correction, and the integrity information obtained after the positioning error correction includes error information and/or alarm information. The error information is related to the positioning integrity, and the error information includes at least one or more of the following information: a protection level, an error source, an error value, a positioning error PE, an integrity level, a threat model, a threat occurrence rate, and a failure mode. The alarm information includes a determining result obtained by comparing the first positioning result with a preset determining condition, and the determining result includes at least one or more of the following information: information about whether an alarm is to be generated, an alarm level corresponding to the first positioning result, and the error information.

Optionally, in at least one embodiment, in response to the positioning procedure being initiated by the terminal device or the third-party device or function such as the 5GC LCS entity (that is, step S802b is performed), the positioning method provided in at least one embodiment further includes the following steps S814a and S814b.

S814a: The access and mobility management device sends a first positioning result or a second positioning result to the terminal device. Correspondingly, the terminal device receives the first positioning result or the second positioning result sent by the access and mobility management device.

In response to step S812 not being performed, the access and mobility management device sends a first positioning result to the terminal device, where the first positioning result includes location information and/or integrity information of the terminal device. In response to step S812 being performed, the access and mobility management device sends a second positioning result to the terminal device, where the second positioning result includes location information and/or integrity information, of the terminal device, obtained after the positioning error correction.

S814b: The access and mobility management device sends a first positioning result or a second positioning result to the third-party device or function (for example, the 5GC LCS entity). Correspondingly, the third-party device or function receives the first positioning result or the second positioning result sent by the terminal device of the access and mobility management device.

In response to step S812 not being performed, the access and mobility management device sends a first positioning result to the third-party device or function, where the first positioning result includes location information and/or integrity information of the terminal device. In response to step S812 being performed, the access and mobility management device sends a second positioning result to the third-party device or function, where the second positioning result includes location information and/or integrity information, of the terminal device, obtained after the positioning error correction.

In the foregoing embodiment, the method for controlling the positioning integrity is designed for the LMF-based positioning solution, and the hierarchical alarm mechanism is used for positioning errors of different systems, to ensure positioning accuracy in real time and ensure high reliability of the positioning system. First, ensuring the integrity of the positioning system is an important research point in R17. Currently, there are almost no evaluation and specific implementation methods for the integrity of the positioning system. This application provides a feasible implementation method for ensuring the positioning integrity of the positioning system. In addition, in this embodiment, the hierarchical alarm mechanism is used for positioning errors of different systems, instead of sending an alarm only in response to an integrity risk occurring. In addition, in this embodiment, an error source is clearly indicated in corresponding alarm information, which helps the positioning system to perform directional adjustment, and effectively ensures the integrity of the positioning system. In addition, the location management device performs error correction based on the error information reported by the terminal device, to ensure positioning accuracy in real time.

Figure 9B:
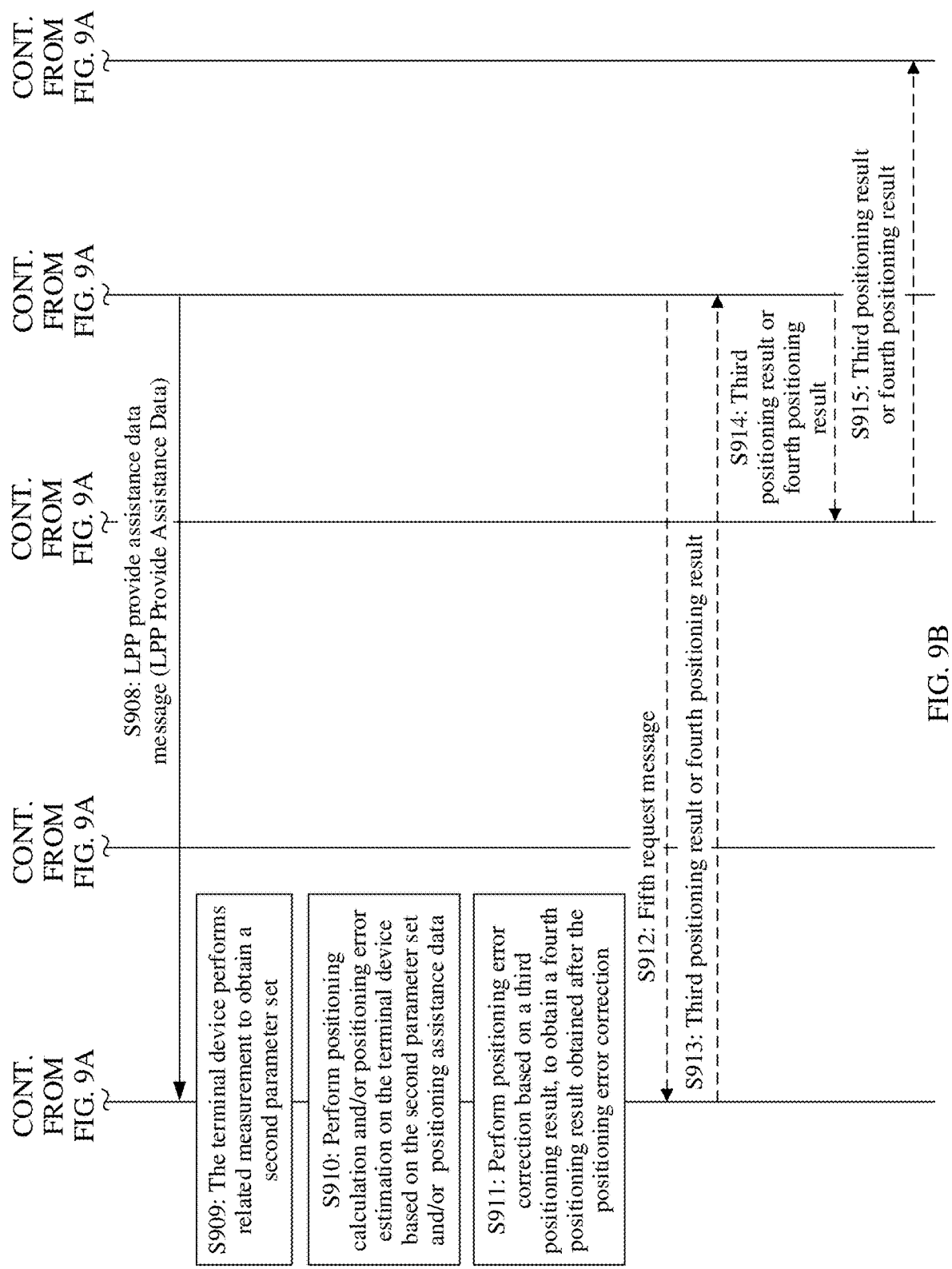

FIG. 9A and FIG. 9B are a schematic flowchart of another method 900 for controlling positioning integrity according to at least one embodiment. As shown in the figure, a location management device in FIG. 9A and FIG. 9B corresponds to the LMF in FIG. 3 or FIG. 4, or the LMC in FIG. 4. A terminal device in FIG. 9A and FIG. 9B corresponds to the UE in FIG. 3 or FIG. 4. A network device in FIG. 9A and FIG. 9B corresponds to the eNB or the gNB in FIG. 3 or FIG. 4. An access and mobility management device in FIG. 9A and FIG. 9B corresponds to the AMF in FIG. 3 or FIG. 4. Different from the UE-assisted/LMF-based positioning solution shown in FIG. 8A and FIG. 8B, this embodiment describes a control method that is designed based on a UE-based positioning solution and that ensures the positioning integrity. This method is applied to the foregoing MO-LR, MT-LR, or NI-LR positioning scenarios. In the UE-based positioning solution, in response to there being assistance data, the terminal device provides a reference signal measurement result and calculates a location of the terminal device. The method 900 for controlling the positioning integrity includes at least the following steps.

In at least one embodiment, a positioning procedure is initiated by using the following step S901a, S901b, or S901c.

S901a: The terminal device sends a positioning request to the access and mobility management device. Correspondingly, the access and mobility management device receives the positioning request from the terminal device. The positioning request requests to locate the terminal device.

In other words, the terminal device initiates the procedure for locating the terminal device, and this step is applied to the MO-LR positioning scenario.

The positioning request is also referred to as a location service request in at least on embodiment. Optionally, indication information related to the positioning integrity is indicated in the positioning request. The indication information includes at least one or more of the following information: a protection level PL, an alert limit AL, an integrity risk IR, a time to alert TTA, an error source, an error value, an integrity level, a threat model, a threat occurrence rate, a failure mode, and the like. For example, one or more of the following information is indicated in a QoS parameter of the positioning request: a protection level PL, an alert limit AL, an integrity risk IR, a time to alert TTA, an error source, an error value, an integrity level, a threat model, a threat occurrence rate, a failure mode, and the like.

S901b: A third-party device or function sends a positioning request to the access and mobility management device. Correspondingly, the access and mobility management device receives the positioning request from the third-party device or function. The positioning request requests to locate the terminal device.

In other words, the third-party device or function initiates the procedure for locating the terminal device, and this step is applied to the MT-LR positioning scenario.

Optionally, the third-party device or function is a 5G core network (5G core, 5GC) location service (location services, LCS) entity, an LCS client, an application function inside/out of a serving PLMN, or the like. For example, the 5GC LCS entity in at least one embodiment is, for example, a gateway mobile positioning center (gateway mobile location center, GMLC).

Optionally, indication information related to the positioning integrity is indicated in the positioning request. The indication information includes at least one or more of the following information: a protection level PL, an alert limit AL, an integrity risk IR, a time to alert TTA, an error source, an error value, an integrity level, a threat model, a threat occurrence rate, a failure mode, and the like. For example, one or more of the following information is indicated in a QoS parameter of the positioning request: a protection level PL, an alert limit AL, an integrity risk IR, a time to alert TTA, an error source, an error value, an integrity level, a threat model, a threat occurrence rate, a failure mode, and the like.

S901c: The access and mobility management device determines some positioning service parameters of the terminal device (for example, the terminal device is to make an emergency call), and triggers a positioning request.

In other words, the access and mobility management device initiates the procedure for locating the terminal device, and this step is applied to the NI-LR positioning scenario.

Optionally, indication information related to the positioning integrity is indicated in the positioning request. The indication information includes at least one or more of the following information: a protection level PL, an alert limit AL, an integrity risk IR, a time to alert TTA, an error source, an error value, an integrity level, a threat model, a threat occurrence rate, a failure mode, and the like. For example, one or more of the following information is indicated in a QoS parameter of the positioning request: a protection level PL, an alert limit AL, an integrity risk IR, a time to alert TTA, an error source, an error value, an integrity level, a threat model, a threat occurrence rate, a failure mode, and the like.

the foregoing provides only examples of several manners of initiating the positioning procedure, and there is another manner of initiating the positioning procedure. This is not specifically limited in at least one embodiment.

Before step S901a, S901b, or S901c in at least one embodiment is performed, the method for controlling the positioning integrity provided in at least one embodiment further includes offline steps, that is, steps that are to be performed before a positioning procedure of a terminal device is started. The offline steps that are performed before step S901a, S901b, or S901c are not specifically described in at least one embodiment, and performing manners of these steps are not specifically limited either. A person skilled in the art is able to refer to an existing technique process.

Further, the method for controlling the positioning integrity provided in at least one embodiment further includes the following steps S902 to S908.

S902: The access and mobility management device sends a positioning request to the location management device. Correspondingly, the location management device receives the positioning request from the access and mobility management device. The positioning request requests to locate the terminal device.

Optionally, indication information related to the positioning integrity is indicated in the positioning request. The indication information includes at least one or more of the following information: a protection level PL, an alert limit AL, an integrity risk IR, a time to alert TTA, an error source, an error value, an integrity level, a threat model, a threat occurrence rate, a failure mode, and the like. For example, one or more of the following information is indicated in a QoS parameter of the positioning request: a protection level PL, an alert limit AL, an integrity risk IR, a time to alert TTA, an error source, an error value, an integrity level, a threat model, a threat occurrence rate, a failure mode, and the like.

The positioning request sent by the access and mobility management device to the location management device is the positioning request in step S901a, S901b, or S901c.

S903: The location management device sends a first request message to the terminal device. Correspondingly, the terminal device receives the first request message from the location management device. The first request message requests a positioning capability of the terminal device.

Optionally, the first request message is carried in an LTE positioning protocol (LTE positioning protocol, LPP) message, that is, the location management device requests the positioning capability from the terminal device by using an LPP message 1. For example, as shown in FIG. 9A and FIG. 9B, the LPP message 1 is, for example, an LPP request capability (LPP Request Capabilities) message.

S904: The terminal device sends a first response message to the location management device. Correspondingly, the location management device receives the first response message from the terminal device. The first response message carries or includes the positioning capability of the terminal device.

Optionally, the first response message is carried in the LTE positioning protocol (LTE positioning protocol, LPP)

message, that is, the terminal device sends the positioning capability of the terminal device to the location management device by using an LPP message 2. For example, as shown in FIG. 9A and FIG. 9B, the LPP message 2 is, for example, an LPP provide capability (LPP Provide Capabilities) message.

For example, in at least one embodiment, the positioning capability of the terminal device is, for example, whether to support control or measurement related to the positioning integrity, for example, measurement on one or more of parameters such as an alert limit AL, a time to alert TTA, or an integrity risk IR in integrity-related KPIs, or measurement on one or more of parameters such as an error source, an error value, an integrity level, a threat model, a threat occurrence rate, and a failure mode in integrity-related KPIs. This is not specifically limited in at least one embodiment.

Optionally, different from the manner of obtaining the positioning capability of the terminal device in steps S903 and S904, in at least one embodiment, the terminal device actively sends the positioning capability of the terminal device to the location management device without requesting. In other words, in response to the method for controlling the positioning integrity provided in this embodiment being performed, step S903 is omitted. This is not specifically limited in at least one embodiment.

S905: The location management device sends a second request message to a next-generation radio access network (next-generation radio access network, NG-RAN).

Correspondingly, the NG-RAN device receives the second request message from the location management device. The second request message requests positioning assistance data.

Optionally, the second request message is carried in an NR positioning protocol (NR positioning protocol annex, NRPPa) message. In other words, the location management device requests the positioning assistance data from the NG-RAN device by using an NRPPa message 1. For example, as shown in FIG. 9A and FIG. 9B, the NRPPa message 1 is, for example, an NRPPa information request (NRPPa Information Request) message.

For example, the positioning assistance data is location information of a network device (for example, the ng-eNB or the gNB in FIG. 3, FIG. 4, or FIG. 7) participating in positioning in the NG-RAN device, for example, a physical cell ID (physical cell IDs, PCIs), a global cell ID (global cell IDs, GCIs), a TP ID, PRS configuration information, or other assistance information related to the positioning integrity control. This is not limited in at least one embodiment. In FIG. 9A and FIG. 9B, the ng-eNB or the gNB that participates in positioning is located in the NG-RAN device.

S906: The NG-RAN sends a second response message to the location management device. Correspondingly, the location management device receives the second response message from the NG-RAN device. The second response message carries or includes the positioning assistance data provided by the NG-RAN device for the location management device.

Optionally, the second response message is carried in the NR positioning protocol (NR positioning protocol annex, NRPPa) message. In other words, the NG-RAN sends the positioning assistance data to the location management device by using an NRPPa message 2. For example, as shown in FIG. 9A and FIG. 9B, the NRPPa message 2 is, for example, an NRPPa information response (NRPPa Information Response) message.

In at least one embodiment, the positioning assistance data provided by the NG-RAN device to the location management device not only includes the location information, the related configuration information, and the like of the network device that participates in positioning in the NG-RAN device, but also include other assistance data that is provided by the NG-RAN device to the location management device and that is used to assist in positioning, for example, location information of another related device in the NG-RAN, or other assistance information related to the positioning integrity control. This is not specifically limited in at least one embodiment.

Optionally, different from the manner of obtaining the positioning assistance data in steps S905 and S906, in at least one embodiment, the NG-RAN device actively sends, without requesting, to the location management device by using the NRPPa message, the positioning assistance data that is provided by the NG-RAN for the location management device. In other words, in response to the method for controlling the positioning integrity provided in this embodiment being performed, step S905 is omitted. This is not specifically limited in at least one embodiment.

S907: The terminal device sends a third request message to the location management device. Correspondingly, the location management device receives the third request message from the terminal device. The third request message requests positioning assistance data.

Optionally, the third request message is carried in the LTE positioning protocol (LTE positioning protocol, LPP) message. In other words, the terminal device requests the positioning assistance data from the location management device by using an LPP message 3. For example, as shown in FIG. 9A and FIG. 9B, the LPP message 3 is, for example, an LPP request assistance data (LPP Request Assistance Data) message.

S908: The location management device sends a third response message to the terminal device. Correspondingly, the terminal device receives the third response message from the location management device. The third response message carries or includes the positioning assistance data provided by the location management device for the terminal device.

Optionally, the third response message is carried in the LTE positioning protocol (LTE positioning protocol, LPP) message. In other words, the location management device sends the positioning assistance data to the terminal device by using an LPP message 4. For example, as shown in FIG. 9A and FIG. 9B, the LPP message 4 is, for example, an LPP provide assistance data (LPP Provide Assistance Data) message.

In at least one embodiment, the positioning assistance data provided by the location management device for the terminal device not only includes the positioning assistance data provided by the NG-RAN device for the location management device, but also includes other assistance data (for example, assistance data that is obtained by the location management device from another gateway) that is provided by the location management device for the terminal device, such as a physical cell ID (physical cell IDs, PCIs), a global cell ID (global cell IDs, GCIs), a TP ID, PRS configuration information, or other assistance information related to the positioning integrity. This is not specifically limited in at least one embodiment.

Optionally, different from the manner of obtaining the positioning assistance data in steps S907 and S908, in at least one embodiment, the location management device actively provides the positioning assistance data to the terminal device without requesting. In other words, in response to the method for controlling the positioning integrity provided in this embodiment being performed, step S707 is omitted. This is not specifically limited in at least one embodiment.

The foregoing steps S901 to S908 provide an example of a procedure in which a network device participates in response to the terminal device obtaining the positioning assistance data in the method for controlling the positioning integrity. Certainly, in the method for controlling the positioning integrity provided in at least one embodiment, the terminal device obtains a plurality of groups of positioning assistance data. In this case, participation of a plurality of network devices is used. For a processing and interaction procedure (not shown in FIG. 9A and FIG. 9B) of each network device, refer to the processing and the related interaction procedure of the NG-RAN device in the foregoing steps S901 to S908. Details are not described herein again.

Further, the positioning method provided in at least one embodiment further includes the following steps S909 to S911.

S909: The terminal device performs related measurement to obtain a second parameter set.

The terminal device measures a downlink reference signal, or obtain the second parameter set from the network device. For this step, refer to the conventional technology. This is not limited in at least one embodiment.

S910: The terminal device performs positioning calculation and/or positioning error estimation on the terminal device based on the second parameter set and/or the positioning assistance data.

In at least one embodiment, the terminal device obtains a third positioning result based on the second parameter set and/or positioning assistance data, where the third positioning result includes location information and/or integrity information of the terminal device, and the integrity information includes the error information and/or alarm information. The error information is related to positioning integrity, and includes at least one or more of the following information: a protection level, an error source, an error value, a positioning error PE, an integrity level, a threat model, a threat occurrence rate, and a failure mode. The alarm information includes a determining result obtained by comparing the third positioning result with a preset determining condition, and the determining result includes at least one or more of the following information: information about whether an alarm is used, an alarm level corresponding to the third positioning result, and the error information.

For example, the error information obtained by the terminal device includes a measurement result of a protection level PL. The PL is compared with related parameters of the positioning integrity: an alert limit AL, a time to alert TTA, an integrity risk IR, a positioning error PE, and the like, to obtain an evaluation of the positioning integrity, thereby ensuring the positioning integrity of the positioning system. The parameters such as the alert limit AL, the time to alert TTA, and the integrity risk IR are preset, and are related to a specific positioning service. The positioning error PE is obtained through calculation, pre-configuration, or measurement.

In at least one embodiment, the determining result includes: in response to the third positioning result meeting the preset determining condition, the determining result includes at least one or more of the following information: the alarm information, the alarm level corresponding to the third positioning result, and the error information; and in response to the third positioning result not meeting the preset determining condition, the determining result includes no-alarm information or does not include alarm information, that is, the determining result selectively includes no-alarm information.

For example, in response to the third positioning result meeting a preset determining condition 3, the determining result includes the alarm information; or in response to the third positioning result meeting a preset determining condition 3, the determining result includes the alarm level corresponding to the third positioning result; or in response to the third positioning result meeting a preset determining condition 3, the determining result includes the error information; or in response to the third positioning result meeting a preset determining condition 3, the determining result includes the alarm information and the alarm level corresponding to the third positioning result; or in response to the third positioning result meeting a preset determining condition 3, the determining result includes the alarm information and the error information; or in response to the third positioning result meeting a preset determining condition 3, the determining result includes the alarm information, the alarm level corresponding to the third positioning result, and the error information. In response to the third positioning result not meeting the preset determining condition 3, the determining result includes information about that no alarm is used, or the determining result does not include any alarm information, that is, the determining result selectively includes no-alarm information.

In at least one embodiment, the determining result includes: in response to the third positioning result not meeting the preset determining condition, the determining result includes at least one or more of the following information: the alarm information, the alarm level corresponding to the third positioning result, and the error information; and in response to the third positioning result meeting the preset determining condition, the determining result includes no-alarm information or does not include alarm information, that is, the determining result selectively includes no-alarm information.

For example, in response to the third positioning result not meeting a preset determining condition 4, the determining result includes the alarm information; or in response to the third positioning result not meeting a preset determining condition 4, the determining result includes the alarm level corresponding to the third positioning result; or in response to the third positioning result not meeting a preset determining condition 4, the determining result includes the error information; or in response to the third positioning result not meeting a preset determining condition 4, the determining result includes the alarm information and the alarm level corresponding to the third positioning result; or in response to the third positioning result not meeting a preset determining condition 4, the determining result includes the alarm information and the error information; or in response to the third positioning result not meeting a preset determining condition 4, the determining result includes the alarm information, the alarm level corresponding to the third positioning result, and the error information. In response to the third positioning result meeting the preset determining condition 4, the determining result includes information about that no alarm is to be generated, or the determining result does not include any alarm information, that is, the determining result selectively includes no-alarm information.

In at least one embodiment, the preset determining condition includes one or more sub-determining conditions, and the alarm level also includes one or more sub-alarm levels. One sub-alarm level corresponds to the one or more sub-determining conditions. For example, a first alarm level is determined in response to a first sub-determining condition and a second sub-determining condition being met, or a first alarm level is determined in response to a first sub-determining condition or a second sub-determining condition not being met. Alternatively, the one or more sub-alarm levels correspond to one sub-determining condition. For example, a first alarm level and a second alarm level is determined in response to a first sub-determining condition being met, and the second alarm level is determined in response to the second sub-determining condition being met again, or a first alarm level and a second alarm level is determined in response to a first sub-determining condition not being met, and the second alarm level is determined in response to the second sub-determining condition not being met again. The determining result includes at least one or more of the following information: information about whether an alarm is used, a sub-alarm level corresponding to the third positioning result, the error information, and the like.

For example, a proximity degree between the protection level PL and the alert limit AL in the integrity-related indicators is used as an example to perform positioning integrity estimation on the operating status of the positioning system, to determine whether an alarm is to be generated. As shown in FIG. 6, an example in which the preset determining condition includes three sub-determining conditions and the alarm level includes three sub-alarm levels is used to describe the hierarchical alarm mechanism provided in at least one embodiment. For example, the three sub-determining conditions is as follows:

(1) PL>AL;
(2) AL−PL∈(0, $\Delta_H$]; and
(3) AL−PL∈($\Delta_H$, $\Delta_L$].

(1) PL>AL.

In response to positioning integrity of the third positioning result meeting the first sub-determining condition PL>AL, the operating status of the positioning system is "system unavailable (system unavailable)". In other words, in response to the protection level PL exceeding the alert limit AL, the positioning system is not suitable for continuing to provide a positioning service due to factors such as a large system positioning error, and the positioning system is unavailable (system unavailable). The alarm level is determined as a sub-alarm level 3 (the highest sub-alarm level), that is, the alarm level 3, which is used to indicate that the positioning system cannot operate normally (System unavailable) at this time. The determining result includes at least one or more of the following information: the alarm information, a third sub-alarm level corresponding to the third positioning result, and the error information.

(2) AL−PL∈(0, $\Delta_H$].

In response to positioning integrity of the third positioning result meeting the second sub-determining condition L−PL∈(0, $\Delta_H$], the operating status of the positioning system is "high risk (High risk)". In other words, in response to the protection level PL approaching the alert limit AL, and a difference between the protection level PL and the AL not exceeding a first threshold $\Delta_H$, a positioning service provided by the positioning system due to factors such as a large system positioning error has low accuracy and poor reliability. The alarm level is determined as a sub-alarm level 2 (the second highest sub-alarm level), that is, the alarm level 2, which is used to indicate that the positioning system is in a high-risk state, and special attention is to be paid to accuracy of a positioning result or the operating status of the positioning system is to be adjusted in a timely manner. The determining result includes at least one or more of the following information: the alarm information, a second sub-alarm level corresponding to the third positioning result, and the error information.

(3) AL−PL∈($\Delta_H$, $\Delta_L$].

In response to positioning integrity of the third positioning result meeting the first sub-determining condition AL−PL∈($\Delta_H$, $\Delta_L$], the operating status of the positioning system is "low risk (Low risk)". In other words, in response to the protection level PL approaching the alert limit AL, and a difference between the protection level PL and the alert limit AL exceeding a first threshold $\Delta_H$ but not exceeding a second threshold $\Delta_L$, and since the positioning system has a small system positioning error, the alarm level is determined as a sub-alarm level 1 (the lowest sub-alarm level), that is, the alarm level 1, which is used to indicate that the positioning system is in a low-risk state, and attention is to be paid to accuracy of a positioning result or the operating status of the positioning system is to be adjusted in a timely manner. The determining result includes at least one or more of the following information: the alarm information, a first sub-alarm level corresponding to the third positioning result, and the error information.

The alert limit AL is a horizontal/vertical alert limit, and is a maximum allowable horizontal/vertical location error. In response to the horizontal error being exceeded, the system is not applicable to an intended application. A value of this indicator is usually preset, and is related to a specific positioning service. The protection level PL is obtained through measurement, calculation, or another manner. This is not limited in at least one embodiment. The positioning error PE is an error distribution/statistical value obtained by considering a plurality of error sources, and different positioning error PE values is obtained according to different positioning methods. The positioning error PE is obtained through measurement, calculation, or another manner. This is not limited in at least one embodiment. The first threshold $\Delta_H$ and the second threshold $\Delta_L$ are all related to a specific positioning service, and is preset, or is also carried in a QoS parameter of a positioning request.

For example, the hierarchical alarm mechanism provided in at least one embodiment is further described by using a proximity degree between the protection level PL, the positioning error PE, and the alert limit AL in the integrity-related indicators as an example to perform positioning integrity estimation on the operating status of the positioning system, to determine whether an alarm is to be generated. As shown in FIG. 8A and FIG. 8B, an example in which the preset determining condition includes two sub-determining conditions and the alarm level includes two sub-alarm levels is used to describe the hierarchical alarm mechanism provided in at least one embodiment. For example, the two sub-determining conditions is as follows:

(1) PL<AL<PE; and
(2) PL<PE<AL.

(1) PL<AL<PE.

In response to positioning integrity of the third positioning result meeting the first sub-determining condition PL<AL<PE, the operating status of the positioning system is "high risk (hazardously operations)". In other words, in response to the "protection level PL" not exceeding the "alert limit AL", and the "alert limit AL" not exceeding the "positioning error PE", a positioning service provided by the positioning system due to factors such as a large system positioning error has low accuracy and poor reliability. The alarm level is determined as a sub-alarm level 2, that is, the alarm level 2, which is used to indicate that the positioning system is in a high-risk state, and special attention is to be paid to accuracy of a positioning result or the operating status of the positioning system is to be adjusted in a timely manner. The determining result includes at least one or more of the following information: the alarm information, a second sub-alarm level corresponding to the third positioning result, and the error information.

(2) PL<PE<AL.

In response to positioning integrity of the third positioning result meeting the second sub-determining condition PL<PE<AL, the operating status of the positioning system is "low risk (Low risk)".

In other words, in response to the "protection level PL" not exceeding the "positioning error PE" and the "positioning error PE" not exceeding the "alert limit AL", and since the positioning system has a small system positioning error, the alarm level is determined as a sub-alarm level 1, that is, the alarm level 1, which is used to indicate that the positioning system is in a low-risk state, and attention is to be paid to accuracy of a positioning result or the operating status of the positioning system is to be adjusted in a timely manner. The determining result includes at least one or more of the following information: the alarm information, a first sub-alarm level corresponding to the third positioning result, and the error information.

In response to PE<PL, that is, in response to the "positioning error PE" of the terminal device not exceeding an error bound corresponding to the "protection level PL", the operating status of the positioning system is "nominal operations (nominal operation)". In this case, the positioning system is able to not generate an alarm. Corresponding indication information selectively includes no-alarm information.

The hierarchical alarm mechanism proposed in at least one embodiment is alternatively based on comparison of another positioning integrity related parameter or another correspondence form between a sub-alarm level and a sub-determining condition. This is not limited in at least one embodiment.

In at least one embodiment, error information is selectively included in the alarm information based on different application scenarios or objectives. The error information usually includes at least one or more of the following information: a protection level, an error source, an error value, an integrity level, a threat model, a threat occurrence rate, and a failure mode. These parameter values included in the error information help the terminal device or another device participating in positioning to take a corresponding adjustment measure based on the error information.

In response to locating the terminal device, in addition to the second parameter set and/or the positioning assistance data, the terminal device further locates the terminal device based on other assistance data obtained from the location management device or another device. This is not specifically limited in at least one embodiment.

Based on the positioning integrity control, optionally, the method for controlling the positioning integrity provided in at least one embodiment further includes the following step S911:

S911: The terminal device performs positioning error correction based on the third positioning result, to obtain a fourth positioning result obtained after the positioning error correction.

Optionally, the terminal device performs positioning error correction on location information of the terminal device based on error information included in integrity information in the third positioning result, for example, parameters such as an error source, an error value, or a positioning error PE, and obtain a fourth positioning result obtained after the positioning error correction, where the fourth positioning result includes location information and/or integrity information, of the terminal device, obtained after the positioning error correction.

Optionally, in at least one embodiment, in response to the positioning procedure not being initiated by the terminal device (that is, step S901a is not performed), but is initiated by the access and mobility management device (that is, step S902c is performed) or the third-party device or function such as the 5GC LCS entity (that is, step S902b is performed), the positioning method provided in at least one embodiment further includes the following steps S912 to S915.

S912: The location management device sends a fifth request message to the terminal device. Correspondingly, the terminal device receives the fifth request message from the location management device. The fifth request message requests location information and/or integrity information of the terminal device.

Optionally, the fifth request message is carried in the LTE positioning protocol (LTE positioning protocol, LPP) message. In other words, the location management device requests the location information and/or the integrity information from the terminal device by using an LPP message 7. For example, as shown in FIG. 9A and FIG. 9B, the LPP message 7 is, for example, LPP request location information (LPP Request Location Information).

In response to step S911 not being performed, the fifth request message is used to request a third positioning result before the positioning error correction, where the third positioning result includes location information and/or integrity information of the terminal device, and the integrity information includes the error information and/or alarm information. The error information is related to positioning integrity, and includes at least one or more of the following information: a protection level, an error source, an error value, a positioning error PE, an integrity level, a threat model, a threat occurrence rate, and a failure mode. The alarm information includes a determining result obtained by comparing the third positioning result with a preset determining condition, and the determining result includes at least one or more of the following information: information about whether an alarm is to be generated, an alarm level corresponding to the third positioning result, and the error information.

In response to step S911 being performed, the fifth request message is used to request a fourth positioning result obtained after the positioning error correction, where the fourth positioning result includes location information and/or integrity information, of the terminal device, obtained after the positioning error correction. The integrity information obtained after the positioning error correction includes error information and/or alarm information obtained after the positioning error correction. The error information is related to positioning integrity, and includes at least one or more of the following information: a protection level, an error source, an error value, a positioning error PE, an integrity level, a threat model, a threat occurrence rate, and a failure mode. The alarm information includes a determining result obtained by comparing the third positioning result with a preset determining condition, and the determining result includes at least one or more of the following information: information about whether an alarm is to be generated, an alarm level corresponding to the fourth positioning result, and the error information.

S913: The terminal device sends a fifth response message to the location management device. Correspondingly, the location management device receives the fifth response message from the terminal device. The fifth response message carries or includes location information and/or integrity information of the terminal device.

Optionally, the fifth response message is carried in the LTE positioning protocol (LTE positioning protocol, LPP) message. In other words, the terminal device sends the location information and/or the integrity information of the terminal device to the location management device by using an LPP message 8. For example, as shown in FIG. 9A and FIG. 9B, the LPP message 8 is, for example, LPP provide location information (LPP Provide Location Information).

If step S911 is not performed, the location information and/or the integrity information of the terminal device that are/is carried or included in the fifth response message is location information and/or integrity information, of the terminal device, before the positioning error correction, namely, the third positioning result. In response to step S911 being performed, the location information and/or the integrity information of the terminal device that are/is carried or included in the fifth response message is the location information and/or the integrity information, of the terminal device, obtained after the positioning error correction, namely, the fourth positioning result.

Optionally, different from the manner of obtaining the location information and/or the integrity information of the terminal device in steps S912 and S913, in at least one embodiment, the terminal device actively provides the location information and/or the integrity information of the terminal device to the location management device without requesting. In other words, in response to the method for controlling the positioning integrity provided in this embodiment being performed, step S912 is omitted. This is not specifically limited in at least one embodiment.

S914: The location management device sends a third positioning result or a fourth positioning result to the access and mobility management device. Correspondingly, the access and mobility management device receives the third positioning result or the fourth positioning result from the location management device.

In response to step S911 not being performed, the access and mobility management device sends a third positioning result to the third-party device or function, where the third positioning result includes location information and/or integrity information of the terminal device. In response to step S911 being performed, the access and mobility management device sends a fourth positioning result to the third-party device or function, where the fourth positioning result includes location information and/or integrity information, of the terminal device, obtained after the positioning error correction.

Optionally, in at least one embodiment, in response to the positioning procedure being initiated by the third-party device or function such as the 5GC LCS entity (that is, step S702b is performed), the positioning method provided in at least one embodiment further includes the following step S915:

S915: The access and mobility management device sends a third positioning result or a fourth positioning result to the third-party device or function (for example, the 5GC LCS entity). Correspondingly, the third-party device or function receives the third positioning result or the fourth positioning result from the access and mobility management device.

In response to step S911 not being performed, the access and mobility management device sends a third positioning result to the third-party device or function, where the third positioning result includes location information and/or integrity information of the terminal device. In response to step S911 being performed, the access and mobility management device sends a fourth positioning result to the third-party device or function, where the fourth positioning result includes location information and/or integrity information, of the terminal device, obtained after the positioning error correction.

In the foregoing embodiment, the method for controlling the positioning integrity is designed for the UE-based positioning solution, and the hierarchical alarm mechanism is used for positioning errors of different systems, to ensure positioning accuracy in real time and ensure high reliability of the positioning system. First, ensuring the integrity of the positioning system is an important research point in R17. Currently, there are almost no evaluation and specific implementation methods for the integrity of the positioning system. This application provides a feasible implementation method for ensuring the positioning integrity of the positioning system. In addition, in this embodiment, the hierarchical alarm mechanism is used for positioning errors of different systems, instead of sending an alarm only in response to an integrity risk occurring. In addition, in this embodiment, an error source is clearly indicated in corresponding alarm information, which helps the positioning system to perform directional adjustment, and effectively ensures the integrity of the positioning system. In addition, the terminal device further performs error correction based on the error information, to ensure positioning accuracy in real time.

The foregoing describes the method embodiments provided in embodiments of at least on embodiment, and the following describes apparatus embodiments provided in at least one embodiment. Descriptions of apparatus embodiments correspond to the descriptions of the method embodiments. Therefore, for content that is not described in detail, refer to the foregoing method embodiments. For brevity, details are not described herein again.

The foregoing mainly describes, from a perspective of interaction between devices, the solutions provided in embodiments of at least on embodiment. To implement the foregoing function, each device, for example, the location management device or the terminal device, includes a corresponding hardware structure and/or software module for performing each function. A person skilled in the art is aware that, in combination with units and algorithm steps of the examples described in embodiments disclosed in this specification, at least on embodiment is implemented by hardware or a combination of hardware and computer software. Whether a function is performed by hardware or hardware driven by computer software depends on particular application s and design constraints of the technical solutions. A person skilled in the art is able to use different methods to implement the described functions described in embodiments herein.

In at least one embodiment, the location management device or the terminal device is divided into function modules based on the foregoing method examples. For example, function modules is obtained through division based on corresponding functions, or two or more functions is integrated into one processing module. The integrated module is implemented in a form of hardware, or is implemented in a form of a software functional module. At least one embodiment, module division is an example, and is merely a logical function division. In actual implementation, another division manner is used. An example in which each functional module is obtained through division based on each corresponding function is used below for description.

Figure 10:
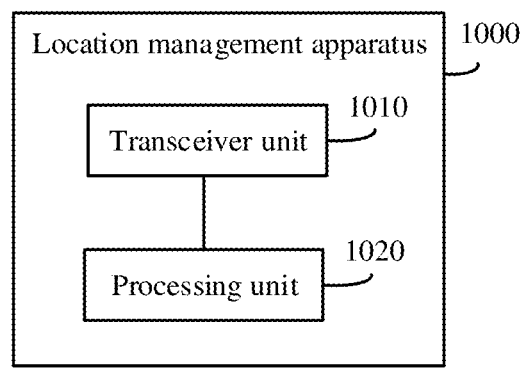
FIG. 10 is a schematic block diagram of a location management apparatus 1000 according to at least one embodiment.

FIG. 10 is a schematic block diagram of a location management apparatus 1000 according to at least one embodiment. The location management apparatus 1000 is a location management device or a chip. The location management apparatus 1000 includes a transceiver unit 1010 and a processing unit 1020. The transceiver unit 1010 communicates with the outside, and the processing unit 1010 is configured to process data. The transceiver unit 1010 is also referred to as a communication interface or a communication unit. The location management apparatus 1000 is configured to perform actions performed by the location management device in the method embodiment shown in FIG. 8A and FIG. 8B or FIG. 9A and FIG. 9B.

The location management apparatus 1000 is configured to perform actions performed by the location management device in the foregoing method embodiments. The transceiver unit 1010 is configured to perform a receiving/sending-related operation on a location management device side in the foregoing method embodiments, and the processing unit 1020 is configured to perform a processing-related operation of the location management device in the foregoing method embodiments.

In at least one embodiment, the transceiver unit 1010 and the processing unit 1020 are configured to perform related steps performed by the location management device in the method for controlling the positioning integrity shown in FIG. 8A and FIG. 8B.

For example, the transceiver unit 1010 is configured to receive a first message sent by a terminal device, where the first message includes a first parameter set, the first parameter set includes measurement information and/or error information that are/is related to location information of the terminal device, the error information is related to positioning integrity, and the error information includes at least one or more of the following information: a protection level, an error source, an error value, a positioning error PE, an integrity level, a threat model, a threat occurrence rate, and a failure mode.

The transceiver unit 1010 is further configured to send a first positioning result to an access and mobility management device.

The transceiver unit 1010 is further configured to send a second positioning result obtained after positioning error correction to the access and mobility management device.

The transceiver unit 1010 is further configured to receive a positioning request sent by the access and mobility management device, where the positioning request includes first indication information related to the positioning integrity, and the first indication information indicates one or more of the following information: an alert limit, an integrity risk, a time to alert, an error source, a threat model, a threat occurrence rate, a failure mode, an error value, and an integrity level.

The transceiver unit 1010 is further configured to: before receiving the first message sent by the terminal device, receive a second message sent by a next-generation radio access network device, where the second message includes positioning assistance data related to the location information of the terminal device.

The processing unit 1020 is configured to obtain a first positioning result based on the first parameter set and/or positioning assistance data, where the first positioning result includes location information and/or integrity information of the terminal device, the integrity information includes the error information and/or alarm information, the alarm information includes a determining result obtained by comparing the first positioning result with a preset determining condition, and the determining result includes at least one or more of the following information: information about whether an alarm is to be generated, an alarm level corresponding to the first positioning result, and the error information.

In at least one embodiment, the determining result includes: in response to the first positioning result meeting the preset determining condition, the determining result includes at least one or more of the following information: the alarm information, the alarm level corresponding to the first positioning result, and the error information; and in response to the first positioning result not meeting the preset determining condition, the determining result selectively includes no-alarm information; or in response to the first positioning result not meeting the preset determining condition, the determining result includes at least one or more of the following information: the alarm information, the alarm level corresponding to the first positioning result, and the error information; and in response to the first positioning result meeting the preset determining condition, the determining result selectively includes no-alarm information.

In at least one embodiment, the preset determining condition includes one or more sub-determining conditions, and the alarm level includes one or more sub-alarm levels; and one sub-alarm level corresponds to the one or more sub-determining conditions; or the one or more sub-alarm levels correspond to one sub-determining condition.

The processing unit 1020 is further configured to perform positioning error correction based on the first positioning result, and obtain a second positioning result obtained after the positioning error correction, where the second positioning result includes location information and/or integrity information, of the terminal device, obtained after the positioning error correction.

For example, the transceiver unit 1010 and the processing unit 1020 is configured to perform the following steps in the embodiment shown in FIG. 8A and FIG. 8B.

The transceiver unit 1010 is configured to receive a positioning request sent by the access and mobility management device. The positioning request requests to locate the terminal device. The positioning request is the positioning request in step S801a, S801b, or S801c.

The transceiver unit 1010 is further configured to send a first request message to the terminal device. The first request message requests a positioning capability of the terminal device.

The transceiver unit 1010 is further configured to receive a first response message sent by the terminal device. The first response message carries or includes the positioning capability of the terminal device.

The transceiver unit 1010 is further configured to send a second request message to the next-generation radio access network (next-generation radio access network, NG-RAN). The second request message requests positioning assistance data.

The transceiver unit 1010 is further configured to receive a second response message sent by the next-generation radio access network. The second response message carries or includes the positioning assistance data provided by the NG-RAN device for the location management apparatus.

The transceiver unit 1010 is further configured to receive a third request message sent by the terminal device. The third request message requests positioning assistance data.

The transceiver unit 1010 is further configured to send a third response message to the terminal device. The third response message carries or includes the positioning assistance data provided by the location management apparatus for the terminal device.

The transceiver unit 1010 is further configured to send a fourth request message to the terminal device. The fourth request message requests a first parameter set.

The transceiver unit 1010 is further configured to receive a fourth response message sent by the terminal device. The fourth response message carries or includes the first parameter set.

The transceiver unit 1010 is further configured to send a first positioning result or a second positioning result to the access and mobility management device.

The processing unit 1020 is configured to perform location calculation and/or positioning error estimation on the terminal device based on the first parameter set and/or the positioning assistance data.

The processing unit 1020 is further configured to perform positioning error correction based on the first positioning result, and obtain a second positioning result obtained after the positioning error correction.

In at least one embodiment, the transceiver unit 1010 and the processing unit 1020 are configured to perform related steps performed by the location management device in the method for controlling the positioning integrity shown in FIG. 9A and FIG. 9B.

The transceiver unit 1010 is configured to receive a third positioning result sent by the terminal device.

The transceiver unit 1010 is further configured to receive a fourth positioning result that is obtained after positioning error correction and that is sent by the terminal device.

The transceiver unit 1010 is further configured to send a third message to the terminal device, where the third message includes positioning assistance data related to location information of the terminal device, and the positioning assistance data is received by the location management device from a next-generation radio access network device.

For example, the transceiver unit 1010 and the processing unit 1020 is configured to perform the following steps in the embodiment shown in FIG. 9A and FIG. 9B.

The transceiver unit 1010 is configured to receive a positioning request sent by an access and mobility management device. The positioning request requests to locate the terminal device. The positioning request is the positioning request in step S901*a*, S901*b*, or S901*c*.

The transceiver unit 1010 is further configured to send a first request message to the terminal device. The first request message requests a positioning capability of the terminal device.

The transceiver unit 1010 is further configured to receive a first response message sent by the terminal device. The first response message carries or includes the positioning capability of the terminal device.

The transceiver unit 1010 is further configured to send a second request message to the next-generation radio access network (next-generation radio access network, NG-RAN). The second request message requests positioning assistance data.

The transceiver unit 1010 is further configured to receive a second response message sent by the next-generation radio access network. The second response message carries or includes the positioning assistance data provided by the NG-RAN device for the location management apparatus.

The transceiver unit 1010 is further configured to receive a third request message sent by the terminal device. The third request message requests positioning assistance data.

The transceiver unit 1010 is further configured to send a third response message to the terminal device. The third response message carries or includes the positioning assistance data provided by the location management apparatus for the terminal device.

The transceiver unit 1010 is further configured to send a fifth request message to the terminal device. The fifth request message requests location information and/or integrity information of the terminal device.

The transceiver unit 1010 is further configured to receive a fifth response message sent by the terminal device. The fifth response message carries or includes location information and/or integrity information of the terminal device.

The transceiver unit 1010 is further configured to send a third positioning result or a fourth positioning result to the access and mobility management device.

All related content of the steps in the foregoing method embodiments is cited in function descriptions of corresponding functional units. Details are not described herein again.

FIG. 10 is an example instead of a limitation. The location management device including the transceiver unit and the processing unit does not depend on the structure shown in FIG. 10.

In response to the terminal apparatus 1200 being a chip, the chip includes a transceiver unit and a processing unit. The transceiver unit is an input/output circuit or a communication interface. The processing unit is a processor, a microprocessor, or an integrated circuit that is integrated on the chip.

In this embodiment, the location management apparatus 1000 is presented in a form in which the functional units are obtained through division in an integrated manner. The "unit" herein is an ASIC, a circuit, a processor that executes one or more software or firmware programs, a memory, an integrated logic circuit, and/or another component capable of providing the foregoing functions.

Figure 11:
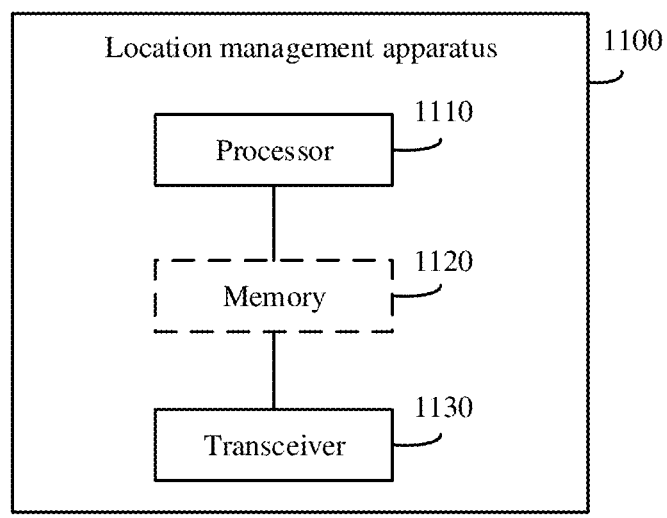
FIG. 11 is a schematic block diagram of a location management apparatus 1100 according to at least one embodiment.

As shown in FIG. 11, at least one embodiment further provides a location management apparatus 1100. The location management apparatus 1100 includes a processor 1110, a memory 1120, and a transceiver 1130. The memory 1120 stores a program. The processor 1110 is configured to execute the program stored in the memory 1120. Execution of the program stored in the memory 1120 enables the processor 1110 to perform related processing steps in the foregoing method embodiments. Execution of the program stored in the memory 1120 enables the processor 1110 to control the transceiver 1130 to perform the receiving/sending steps in the foregoing method embodiments. Optionally, the location management apparatus 1100 includes only the processor 1110 and the transceiver 1130, and does not include the memory 1120. This is not limited in at least one embodiment.

In an implementation, the location management apparatus 1100 is configured to perform the actions performed by the location management device in the foregoing method embodiments shown in FIG. 8A and FIG. 8B. In this case, the execution of the program stored in the memory 1120 enables the processor 1110 to perform the processing steps on the location management device side in the foregoing method embodiments shown in FIG. 8A and FIG. 8B. The execution of the program stored in the memory 1120 enables the processor 1110 to control the transceiver 1130 to perform the receiving/sending steps on the location management device side in the foregoing method embodiments shown in FIG. 8A and FIG. 8B. Optionally, the location management apparatus 1100 includes only the processor 1110 and the transceiver 1130, and does not include the memory 1120. This is not limited in at least one embodiment.

In another implementation, the location management apparatus 1100 is configured to perform the actions performed by the location management device in the foregoing method embodiments shown in FIG. 9A and FIG. 9B. In this case, the execution of the program stored in the memory 1120 enables the processor 1110 to perform the processing steps on the location management device side in the foregoing method embodiments shown in FIG. 9A and FIG. 9B. The execution of the program stored in the memory 1120 enables the processor 1110 to control the transceiver 1130 to perform the receiving/sending steps on the location management device side in the foregoing method embodiments shown in FIG. 9A and FIG. 9B. Optionally, the location management apparatus 1100 includes only the processor 1110 and the transceiver 1130, and does not include the memory 1120. This is not limited in at least one embodiment.

All related content of the steps in the foregoing method embodiments is cited in function descriptions of corresponding functional components. Details are not described herein again.

Figure 12:
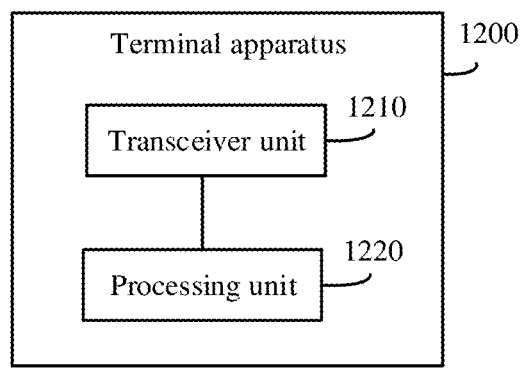
FIG. 12 is a schematic block diagram of a terminal apparatus 1200 according to at least one embodiment.

An embodiment of at least on embodiment further provides a terminal apparatus 1200. The terminal apparatus 1200 is a terminal device or a chip. FIG. 12 is a schematic block diagram of the terminal apparatus 1200 according to at least one embodiment. The terminal apparatus 1200 includes a transceiver unit 1210 and a processing unit 1220. The transceiver unit 1210 communicates with the outside, and the processing unit 1210 is configured to process data. The transceiver unit 1210 is also referred to as a communication interface or a communication unit. The terminal apparatus 1200 is configured to perform actions performed by the terminal device in the method embodiment shown in FIG. 8A and FIG. 8B or FIG. 9A and FIG. 9B.

The terminal apparatus 1200 is configured to perform actions performed by the terminal device in the foregoing method embodiments. The transceiver unit 1210 is configured to perform a receiving/sending-related operation on a terminal device side in the foregoing method embodiments, and the processing unit 1020 is configured to perform a processing-related operation of the terminal device in the foregoing method embodiments.

In at least one embodiment, the transceiver unit 1210 and the processing unit 1220 are configured to perform related steps performed by the terminal device in the method for controlling the positioning integrity shown in FIG. 8A and FIG. 8B.

For example, the transceiver unit 1210 is configured to send a first message to a location management device, where the first message includes a first parameter set, the first parameter set includes measurement information and/or error information that are/is related to location information of the terminal device, the error information is related to positioning integrity, and the error information includes at least one or more of the following information: a protection level, an error source, an error value, a positioning error PE, an integrity level, a threat model, a threat occurrence rate, and a failure mode.

For example, the transceiver unit 1210 and the processing unit 1220 is configured to perform the following steps in the embodiment shown in FIG. 8A and FIG. 8B.

The transceiver unit 1210 is configured to send a positioning request sent by an access and mobility management device. The positioning request requests to locate the terminal device.

The transceiver unit 1210 is further configured to receive a first request message sent by the location management device. The first request message requests a positioning capability of the terminal device.

The transceiver unit 1210 is further configured to send a first response message to the location management device. The first response message carries or includes the positioning capability of the terminal device.

The transceiver unit 1210 is further configured to send a third request message to the location management device. The third request message requests positioning assistance data.

The transceiver unit 1210 is further configured to receive a third response message sent by the location management device. The third response message carries or includes the positioning assistance data provided by the location management device for the terminal device.

The transceiver unit 1210 is further configured to receive a fourth request message sent by the location management device. The fourth request message requests a first parameter set.

The transceiver unit 1210 is further configured to send a fourth response message to the location management device. The fourth response message carries or includes the first parameter set.

The transceiver unit 1210 is further configured to receive a first positioning result or a second positioning result sent by the access and mobility management device. The transceiver unit 1210 is further configured to receive a fourth response message sent by the terminal device. The fourth response message carries or includes the first parameter set.

The transceiver unit 1210 is further configured to send a first positioning result or a second positioning result to the access and mobility management device.

The processing unit 1220 is configured to obtain the first parameter set.

In at least one embodiment, the transceiver unit 1210 and the processing unit 1220 are configured to perform related steps performed by the terminal device in the method for controlling the positioning integrity shown in FIG. 9A and FIG. 9B.

The processing unit 1220 is configured to obtain a second parameter set, where the second parameter set includes measurement information and/or error information that are/is related to location information of the terminal device, the error information is related to positioning integrity, and the error information includes at least one or more of the following information: a protection level, an error source, an error value, a positioning error PE, an integrity level, a threat model, a threat occurrence rate, and a failure mode; where the processing unit 1220 is further configured to obtain a third positioning result based on the second parameter set and/or positioning assistance data, where the third positioning result includes location information and/or integrity information of the terminal device, the integrity information includes the error information and/or alarm information, the alarm information includes a determining result obtained by comparing the third positioning result with a preset determining condition, and the determining result includes at least one or more of the following information: information about whether an alarm is to be generated, an alarm level corresponding to the first positioning result, and the error information.

In at least one embodiment, the determining result includes:

if the third positioning result meets the preset determining condition, the determining result includes at least one or more of the following information: the alarm information, an alarm level corresponding to the third positioning result, and the error information; and if the third positioning result does not meet the preset determining condition, the determining result selectively includes no-alarm information; or if the third positioning result does not meet the preset determining condition, the determining result includes at least one or more of the following information: the alarm information, an alarm level corresponding to the third positioning result, and the error information; and if the third positioning result meets the preset determining condition, the determining result selectively includes no-alarm information.

In at least one embodiment, the preset determining condition includes one or more sub-determining conditions, and the alarm level includes one or more sub-alarm levels.

one sub-alarm level corresponds to the one or more sub-determining conditions; or the one or more sub-alarm levels correspond to one sub-determining condition.

The processing unit 1220 is further configured to perform positioning error correction based on the third positioning result, and obtain a fourth positioning result obtained after the positioning error correction, where the fourth positioning result includes location information and/or integrity information, of the terminal device, obtained after the positioning error correction.

The processing unit 1220 is further configured to obtain a second parameter set. The obtaining the second parameter set includes: obtaining the second parameter set through measurement, or from the next-generation radio access network device, or from a network device that participates in positioning and that includes a location management component.

The transceiver unit 1210 is configured to send a third positioning result to the location management device.

The transceiver unit 1210 is further configured to send a fourth positioning result obtained after the positioning error correction to the location management device.

The transceiver unit 1210 is further configured to send a positioning request to the access and mobility management device, where the positioning request includes first indication information related to the positioning integrity, and the first indication information indicates one or more of the following information: an alert limit, an integrity risk, a time to alert, an error source, a threat model, a threat occurrence rate, a failure mode, an error value, and an integrity level.

The transceiver unit 1210 is further configured to receive a third message sent by the location management device, where the third message includes positioning assistance data related to location information of the terminal device, and the positioning assistance data is received by the location management device from a next-generation radio access network device.

For example, the transceiver unit 1210 and the processing unit 1220 is configured to perform the following steps in the embodiment shown in FIG. 9A and FIG. 9B.

The transceiver unit 1210 is configured to send a positioning request sent by an access and mobility management device. The positioning request requests to locate the terminal device.

The transceiver unit 1210 is further configured to receive a first request message sent by the location management device. The first request message requests a positioning capability of the terminal device.

The transceiver unit 1210 is further configured to send a first response message to the location management device. The first response message carries or includes the positioning capability of the terminal device.

The transceiver unit 1210 is further configured to send a third request message to the location management device. The third request message requests positioning assistance data.

The transceiver unit 1210 is further configured to receive a third response message sent by the location management device. The third response message carries or includes the positioning assistance data provided by the location management device for the terminal device.

The transceiver unit 1210 is further configured to receive a third request message sent by the terminal device. The third request message requests positioning assistance data.

The transceiver unit 1210 is further configured to receive a fifth request message sent by the location management device. The fifth request message requests location information and/or integrity information of the terminal device.

The transceiver unit 1210 is further configured to send a fifth response message to the location management device. The fifth response message carries or includes location information and/or integrity information of the terminal device.

The processing unit 1220 is configured to perform related measurement to obtain a second parameter set.

The processing unit 1220 is further configured to perform positioning calculation and/or positioning error estimation on the terminal device based on the second parameter set and/or the positioning assistance data.

The processing unit 1220 is further configured to perform positioning error correction based on the third positioning result, and obtain a fourth positioning result obtained after the positioning error correction.

All related content of the steps in the foregoing method embodiments is cited in function descriptions of corresponding functional units. Details are not described herein again.

FIG. 12 is an example instead of a limitation. The terminal device including the transceiver unit and the processing unit does not depend on the structure shown in FIG. 12.

In response to the terminal apparatus 1200 being a chip, the chip includes a transceiver unit and a processing unit. The transceiver unit is an input/output circuit or a communication interface. The processing unit is a processor, a microprocessor, or an integrated circuit that is integrated on the chip.

In this embodiment, the terminal apparatus 1200 is presented in a form in which the functional units are obtained through division in an integrated manner. The "unit" herein is an ASIC, a circuit, a processor that executes one or more software or firmware programs, a memory, an integrated logic circuit, and/or another component capable of providing the foregoing functions.

Figure 13:
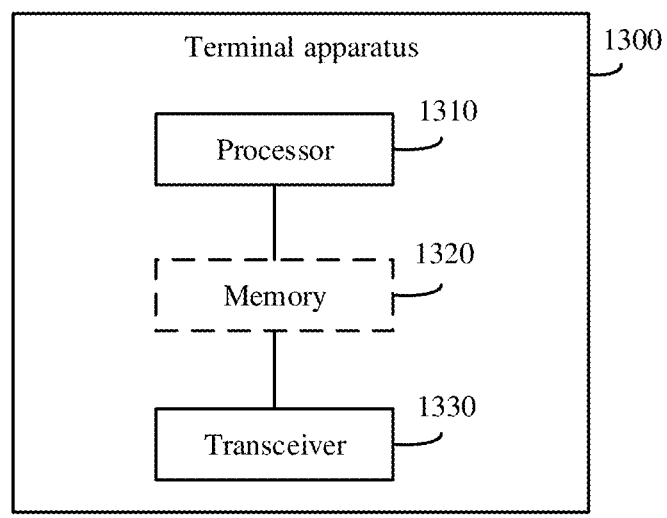
FIG. 13 is a schematic block diagram of a terminal apparatus 1300 according to at least one embodiment.

As shown in FIG. 13, at least one embodiment further provides a terminal apparatus 1300. The terminal apparatus 1300 includes a processor 1310, a memory 1320, and a transceiver 1330. The memory 1320 stores a program. The processor 1310 is configured to execute the program stored in the memory 1320. Execution of the program stored in the memory 1320 enables the processor 1310 to perform related processing steps in the foregoing method embodiments. Execution of the program stored in the memory 1320 enables the processor 1310 to control the transceiver 1330 to perform the receiving/sending steps in the foregoing method embodiments. Optionally, the terminal apparatus 1300 includes only the processor 1310 and the transceiver 1330, and does not include the memory 1320. This is not limited in at least one embodiment.

In an implementation, the terminal apparatus 1300 is configured to perform the actions performed by the terminal device in the foregoing method embodiments shown in FIG. 8A and FIG. 8B. In this case, the execution of the program stored in the memory 1320 enables the processor 1310 to perform the processing steps on the terminal device side in the foregoing method embodiments shown in FIG. 8A and FIG. 8B. The execution of the program stored in the memory 1320 enables the processor 1310 to control the transceiver 1330 to perform the receiving/sending steps on the terminal device side in the foregoing method embodiments shown in FIG. 8A and FIG. 8B. Optionally, the terminal apparatus 1300 includes only the processor 1310 and the transceiver 1330, and does not include the memory 1320.

In another implementation, the terminal apparatus 1300 is configured to perform the actions performed by the terminal device in the foregoing method embodiments shown in FIG. 9A and FIG. 9B. In this case, the execution of the program stored in the memory 1320 enables the processor 1310 to perform the processing steps on the terminal device side in the foregoing method embodiments shown in FIG. 9A and FIG. 9B. The execution of the program stored in the memory 1320 enables the processor 1310 to control the transceiver 1330 to perform the receiving/sending steps on the terminal device side in the foregoing method embodiments shown in FIG. 9A and FIG. 9B. Optionally, the terminal apparatus 1300 includes only the processor 1310 and the transceiver 1330, and does not include the memory 1320.

All related content of the steps in the foregoing method embodiments is cited in function descriptions of corresponding functional components. Details are not described herein again.

At least one embodiment further provides a communication system. The communication system includes at least the location management device in the embodiment shown in FIG. 8A and FIG. 8B or FIG. 9A and FIG. 9B and the terminal device in the embodiment shown in FIG. 8A and FIG. 8B or FIG. 9A and FIG. 9B, and further includes a network device participating in positioning, an access and mobility management device, and the like.

At least one embodiment further provides a computer-readable storage medium. The computer-readable storage medium stores a computer program. In response to the computer program being executed by a computer, the computer is enabled to implement the method performed by the location management device in the method embodiment shown in FIG. 8A and FIG. 8B or FIG. 9A and FIG. 9B.

At least one embodiment further provides a computer-readable storage medium. The computer-readable storage medium stores a computer program. In response to the computer program being executed by a computer, the computer is enabled to implement the method performed by the terminal device in the method embodiment shown in FIG. 8A and FIG. 8B or FIG. 9A and FIG. 9B.

At least one embodiment further provides a computer program product including a computer program. In response to the computer program being executed by a computer, the computer is enabled to implement the method performed by the location management device in the method embodiment shown in FIG. 8A and FIG. 8B or FIG. 9A and FIG. 9B.

At least one embodiment further provides a computer program product including a computer program. In response to the computer program being executed by a computer, the computer is enabled to implement the method performed by the terminal device in the method embodiment shown in FIG. 8A and FIG. 8B or FIG. 9A and FIG. 9B.

For explanations and beneficial effects of related content of any communication apparatus provided above, refer to a corresponding method embodiment provided above. Details are not described herein again.

In at least one embodiment, the terminal device, the location management device, the network device, or the like includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). The operating system is any one or more computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application is run to perform communication according to the method provided in embodiments of this application. For example, the method provided in embodiments of this application is performed by the terminal device, the location management device, or the network device, or a function module that invokes and executes the program in the terminal device, the location management device, or the network device.

In addition, aspects or features of this application is implemented as a method, an apparatus, or a product that uses standard programming and/or engineering technologies. A "product" to which the methods provided in at least one embodiment are applied covers a computer program that is accessed from any computer-readable component, carrier, or medium. For example, the computer-readable medium includes but is not limited to: a magnetic storage component (for example, a hard disk, a floppy disk or a magnetic tape), an optical disc (for example, a compact disc (compact disc, CD), a digital versatile disc (digital versatile disc, DVD), a smart card and a flash memory component (for example, erasable programmable read-only memory (erasable programmable read-only memory, EPROM), a card, a stick, or a key drive). In addition, various storage media described in at least one embodiment represents one or more devices and/or other machine-readable media that are configured to store information. The term "machine readable media" includes but is not limited to a radio channel, and various other media that stores, contains and/or carries instructions and/or data.

The processor mentioned in embodiments of at least one embodiment is a central processing unit (central processing unit, CPU), or the processor is another general-purpose processor, a digital signal processor (digital signal processor, DSP), an application-specific integrated circuit (application-specific integrated circuit, ASIC), a field programmable gate array (field programmable gate array, FPGA), another programmable logic device, a discrete gate or transistor logic device, a discrete hardware component, or the like. The general-purpose processor is a microprocessor, or the processor is any conventional processor or the like.

The memory mentioned in at least one embodiment is a volatile memory or a nonvolatile memory, or includes a volatile memory and a nonvolatile memory. The nonvolatile memory is a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory is a random access memory (random access memory, RAM) and is used as an external cache. For example but not limitation, many forms of RAMs is used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

In response to the processor being a general-purpose processor, a DSP, an ASIC, an FPGA or another programmable logic device, a discrete gate or transistor logic device, or a discrete hardware component, the memory (storage module) is integrated into the processor.

The memory described in embodiments described herein aims to include but is not limited to these memories and any memory of another proper type.

A person of ordinary skill in the art is aware that, in combination with the examples described in embodiments disclosed in this specification, units and algorithm steps is implemented by electronic hardware or a combination of computer software and electronic hardware. Whether the functions are performed by hardware or software depends on particular applications and design constraints of the technical solutions. A person skilled in the art is able to use different methods to implement the described functions for each particular application, but the implementation does not go beyond the scope of embodiments described herein.

A person skilled in the art understands that, for the purpose of convenient and brief description, for a detailed operating process of the foregoing system, apparatus, and unit, refer to a corresponding process in the foregoing method embodiments, and details are not described herein again.

In at least one embodiment, the disclosed system, apparatus, and method are implemented in another manner. For example, the described apparatus embodiment is merely an example. For example, division into the units is merely logical function division and is other division in actual implementation. For example, a plurality of units or components is combined or integrated into another system, or some features is ignored or not performed. In addition, the displayed or discussed mutual couplings or direct couplings or communication connections is implemented through some interfaces. The indirect couplings or communication connections between the apparatuses or units is implemented in electrical, mechanical, or another form.

The units described as separate parts may or may not be physically separate, and parts displayed as units may or may not be physical units, is located in one position, or is distributed on a plurality of network units. Some or all of the units is selected based on achieving the objectives of at least one embodiment.

In addition, functional units in at least one embodiment are integrated into one processing unit, or each of the units exist alone physically, or two or more units are integrated into one unit.

In response to the functions being implemented in the form of a software functional unit and sold or used as an independent product, the functions are stored in a computer-readable storage medium. Based on such an understanding, the technical solutions of at least one embodiment, or the part contributing to the prior art, or some of the technical solutions are implemented in a form of a software product. The computer software product is stored in a readable storage medium, and includes several instructions for instructing a computer device (which is a personal computer, a server, or a network device) to perform all or some of the steps of the methods described in at least one embodiment. The foregoing readable storage medium includes any medium that stores program code, such as a USB flash drive, a removable hard disk, a read-only memory (read-only memory, ROM), a random access memory (random access memory, RAM), a magnetic disk, or an optical disc.

The foregoing descriptions are merely specific implementations of at least one embodiment, but are not intended to limit the protection scope of embodiments described herein. Any variation or replacement readily figured out by a person skilled in the art within the technical scope falls within the protection scope of at least one embodiment. Therefore, the protection scope at least one embodiment is subject to the protection scope of the claims and/or the specification.

What is claimed is:

1. A method for controlling positioning integrity, comprising:
   receiving, by a location management device, a first message from a terminal device, wherein the first message includes a first parameter set, the first parameter set includes error information related to location information of the terminal device, wherein the error information is related to positioning integrity, and further wherein the error information includes at least one or more of the following information: a protection level, an error source, an error value, a positioning error (PE), an integrity level, a threat model, a threat occurrence rate, or a failure mode; and
   obtaining, by the location management device, a first positioning result based on the first parameter set, wherein the first positioning result includes integrity information of the terminal device, the integrity information includes alarm information, the alarm information includes a determining result obtained by comparing the first positioning result with a preset determining condition, and the determining result includes at least one or more of the following information: information about whether an alarm is required, an alarm level corresponding to the first positioning result, or the error information.

2. The method according to claim 1, wherein the determining result includes:
   in response to the first positioning result meeting the preset determining condition, the determining result includes at least one or more of the following information: the alarm information, the alarm level corresponding to the first positioning result, or the error information; and
   in response to the first positioning result not meeting the preset determining condition, the determining result selectively includes no-alarm information; or in response to the first positioning result not meeting the preset determining condition, the determining result includes at least one or more of the following information: the alarm information, the alarm level corresponding to the first positioning result, or the error information; and in response to the first positioning result meeting the preset determining condition, the determining result selectively includes no-alarm information.

3. The method according to claim 1, wherein before the receiving, by the location management device, the first message from the terminal device, the method further comprises:

receiving, by the location management device, a positioning request from an access and mobility management device, wherein the positioning request includes first indication information related to the positioning integrity, and the first indication information indicates one or more of the following information: an alert limit, an integrity risk, a time to alert, an error source, a threat model, a threat occurrence rate, a failure mode, an error value, or an integrity level.

4. The method according to claim 1, wherein before the receiving, by the location management device, the first message from the terminal device, the method further includes:

receiving, by the location management device, a second message from a next-generation radio access network device, wherein the second message includes the positioning assistance data related to the location information of the terminal device.

5. The method according to claim 1, wherein before the receiving, by the location management device, the first message from the terminal device, the method further comprises:

receiving, by the location management device, positioning capability from the terminal device, wherein the positioning capability indicates whether control or measurement related to the positioning integrity is supported by the terminal device.

6. The method according to claim 5, where the control or measurement related to the positioning integrity indicates one or more of the following information: an alert limit, an integrity risk, a time to alert, an error source, a threat model, a threat occurrence rate, a failure mode, an error value, or an integrity level.

7. A method for controlling positioning integrity, comprising:

obtaining, by a terminal device, a first parameter set, wherein the first parameter set includes measurement information; and obtaining, by the terminal device, a first positioning result based on the first parameter set and positioning assistance data, wherein the first positioning result includes integrity information of the terminal device, the integrity information includes error information, wherein the error information includes a protection level.

8. The method according to claim 7, wherein the method further comprises: sending, by the terminal device, the first positioning result to a location management device.

9. The method according to claim 7, wherein before the obtaining, by the terminal device, the first parameter set, the method further comprises:

sending, by the terminal device, a positioning request to an access and mobility management device, wherein the positioning request includes first indication information related to the positioning integrity, and the first indication information indicates one or more of the following information: an alert limit, an integrity risk, a time to alert, an error source, a threat model, a threat occurrence rate, a failure mode, an error value, or an integrity level.

10. The method according to claim 7, wherein before the obtaining, by the terminal device, the first parameter set, the method further comprises:

receiving, by the terminal device, a first message from location management device, wherein the first message includes the positioning assistance data related to the location information of the terminal device, and the positioning assistance data is received from the location management device from a next-generation radio access network device.

11. The method according to claim 7, wherein before the obtaining, by the terminal device, the first parameter set, the method further comprises:

sending, by the terminal device, positioning capability of the terminal device to location management device, wherein the positioning capability indicates whether control or measurement related to the positioning integrity is supported by the terminal device.

12. The method according to claim 11, where the control or measurement related to the positioning integrity indicates one or more of the following information: an alert limit, an integrity risk, a time to alert, an error source, a threat model, a threat occurrence rate, a failure mode, an error value, or an integrity level.

13. A terminal apparatus, comprising:
a transceiver;
a processor; and
a non-transitory computer-readable storage medium storing computer programs, the computer programs comprising program instructions which, when executed by the processor, are configured with the processor to perform the steps of:

obtaining, a first parameter set, wherein the first parameter set includes measurement information; and obtaining a first positioning result based on the first parameter set and positioning assistance data, wherein the first positioning result includes integrity information of the terminal apparatus, the integrity information includes error information, wherein the error information includes a protection level.

14. The terminal apparatus according to claim 13, wherein the program including further instructions to: send the first positioning result to a location management device.

15. The terminal apparatus according to claim 13, wherein before the obtaining the first parameter set, the program including further instructions to:

sending a positioning request to an access and mobility management device, wherein the positioning request includes first indication information related to the positioning integrity, and the first indication information indicates one or more of the following information: an alert limit, an integrity risk, a time to alert, an error source, a threat model, a threat occurrence rate, a failure mode, an error value, or an integrity level.

16. The terminal apparatus according to claim 13, wherein before the obtaining the first parameter set, the program including further instructions to:

receiving a first message from the location management device, wherein the first message includes the positioning assistance data related to the location information of the processor, and the positioning assistance data is received by the location management device from a next-generation radio access network device.

17. The terminal apparatus according to claim 13, wherein before the obtaining the first parameter set, the program including further instructions to:
sending positioning capability of the processor to the location management device, wherein the positioning capability indicates whether control or measurement related to the positioning integrity is supported by the processor.

18. The terminal apparatus according to claim 17, where the control or measurement related to the positioning integrity indicates one or more of the following information: an alert limit, an integrity risk, a time to alert, an error source, a threat model, a threat occurrence rate, a failure mode, an error value, or an integrity level.

\* \* \* \* \*